US012446033B2

United States Patent
Bhamri et al.

(10) Patent No.: US 12,446,033 B2
(45) Date of Patent: *Oct. 14, 2025

(54) USER EQUIPMENT AND SYSTEM PERFORMING TRANSMISSION AND RECEPTION OPERATIONS

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Tetsuya Yamamoto, Kanagawa (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,792

(22) Filed: Jun. 13, 2024

(65) Prior Publication Data
US 2024/0334431 A1    Oct. 3, 2024

Related U.S. Application Data

(63) Continuation of application No. 17/399,795, filed on Aug. 11, 2021, now Pat. No. 12,052,706, which is a (Continued)

(30) Foreign Application Priority Data

Feb. 14, 2019    (EP) .................................... 19000087

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0053* (2013.01); *H04W 72/0446* (2013.01); (Continued)

(58) Field of Classification Search
CPC ... H04W 28/04; H04W 72/04; H04W 72/042; H04W 88/08; H04W 72/1268; (Continued)

(56) References Cited

U.S. PATENT DOCUMENTS

2018/0270799 A1* 9/2018 Noh ....................... H04L 27/261
2019/0036658 A1* 1/2019 Kim ....................... H04W 72/20
(Continued)

FOREIGN PATENT DOCUMENTS

EP    2991419 A1    3/2016
JP    2016519538 A    6/2016
(Continued)

OTHER PUBLICATIONS

3GPP TSG RAN WG1 Meeting AH 1801, Vancouver, Canada, Jan. 22-26, 2018, R1-1800537, Agenda Item: 7.3.3.1, Source: NEC, Title: Remaining details of the DL/UL Resource allocation schemes. (Year: 2018).*
(Continued)

*Primary Examiner* — Asad M Nawaz
*Assistant Examiner* — Sanjay K Dewan
(74) *Attorney, Agent, or Firm* — Seed Intellectual Property Law Group LLP

(57)    ABSTRACT

A user equipment (UE) receives a physical uplink shared channel (PUSCH) config information element (IE) in form of radio resource control (RRC) signaling; configures a table which is defined by a PUSCH time domain resource allocation list IE carried in the received PUSCH config IE, the table comprising rows, each with a value indicating a PUSCH mapping type, a value K2 indicating a slot offsets,
(Continued)

and a value SLIV indicating a start and length indicator value; and receives downlink control information (DCI) in form of medium access control (MAC) signaling carrying a time-domain resource assignment filed with value m, wherein the value m provides a row index m+1 to the RRC configured table. The UE determines allocated resources for an initial PUSCH transmission and allocated resources for at least one repetition thereof, and performs a PUSCH transmission using the respectively determined allocated resources.

10 Claims, 13 Drawing Sheets

Related U.S. Application Data continuation of application No. PCT/EP2019/086671, filed on Dec. 20, 2019.

(51) Int. Cl.
*H04W 72/0446* (2023.01)
*H04W 72/0453* (2023.01)
*H04W 72/23* (2023.01)
*H04W 80/02* (2009.01)

(52) U.S. Cl.
CPC ....... *H04W 72/0453* (2013.01); *H04W 72/23* (2023.01); *H04W 80/02* (2013.01)

(58) Field of Classification Search
CPC ............. H04W 72/23; H04W 72/0446; H04W 72/0453; H04L 5/0007; H04L 5/0053
USPC ....................................................... 370/329
See application file for complete search history.

(56) References Cited

U.S. PATENT DOCUMENTS

| | | | |
|---|---|---|---|
| 2019/0053211 A1* | 2/2019 | Ying | H04W 72/044 |
| 2019/0349964 A1* | 11/2019 | Liou | H04B 7/0626 |
| 2019/0394759 A1* | 12/2019 | Ying | H04L 1/0061 |
| 2020/0053757 A1* | 2/2020 | Bagheri | H04L 5/10 |
| 2020/0146032 A1* | 5/2020 | Bae | H04L 1/1819 |
| 2021/0112586 A1 | 4/2021 | Bhamri et al. | |
| 2022/0053552 A1 | 2/2022 | Li | |
| 2022/0159706 A1* | 5/2022 | Panteleev | H04L 1/08 |
| 2022/0173867 A1* | 6/2022 | Nogami | H04L 5/001 |
| 2022/0191912 A1* | 6/2022 | Liu | H04W 72/23 |
| 2022/0279551 A1* | 9/2022 | Liu | H04W 72/0446 |
| 2022/0353698 A1* | 11/2022 | Jang | H04L 5/0053 |
| 2022/0377767 A1* | 11/2022 | Ying | H04L 1/1896 |
| 2023/0300827 A1* | 9/2023 | Ying | H04L 5/0051 370/329 |

FOREIGN PATENT DOCUMENTS

| | | | | |
|---|---|---|---|---|
| JP | 2018-023150 A | * | 2/2018 | ............ H04W 72/04 |
| KR | 20180127249 A | * | 11/2018 | ............... H04L 1/08 |
| RU | 2669917 C1 | | 10/2018 | |
| WO | WO 2016161618 A1 | | 10/2016 | |
| WO | WO 2018212628 A1 | | 11/2018 | |
| WO | WO 2020170972 A1 | | 8/2020 | |
| WO | WO 2020200176 A1 | | 10/2020 | |

OTHER PUBLICATIONS

3GPP TSG RAN WG1 Meeting #92, Athens, Greece, Feb. 26-Mar. 2, 2018, R1-1803295, Source: NTT Docomo, Inc., Title: Offline summary for AI 7.1.3.3.4 UL data transmission procedure, Agenda Item: 7.1.3.3.4. (Year: 2018).*

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 56 pages.
3GPP TR 38.913 V15.0.0, "3rd Generation Partnership Project; Technical Specification Group Radio Access Network; Study on Scenarios and Requirements for Next Generation Access Technologies; (Release 15)," Jun. 2018. (39 pages).
3GPP TS 22.261 V16.4.0, "3rd Generation Partnership Project; Technical Specification Group Services and System Aspects; Service requirements for the 5G system; Stage 1 (Release 16)," Jun. 2018, 55 pages.
3GPP TS 38.211 V15.4.0, "3rd Generation Partnership Project; Technical Specification Group Radio Access Network; NR; Physical channels and modulation (Release 15)," Dec. 2018, 96 pages.
3GPP TS 38.212 V15.4.0, "3rd Generation Partnership Project; Technical Specification Group Radio Access Network; NR; Multiplexing and channel coding (Release 15)," Dec. 2018, 100 pages.
3GPP TS 38.213 V15.4.0, "3rd Generation Partnership Project; Technical Specification Group Radio Access Network; NR; Physical layer procedures for control (Release 15)," Dec. 2018, 104 pages.
3GPP TS 38.214 V15.4.0, "3rd Generation Partnership Project; Technical Specification Group Radio Access Network; NR; Physical layer procedures for data (Release 15)," Dec. 2018, 103 pages.
3GPP TS 38.300 V15.0.0, "3rd Generation Partnership Project; Technical Specification Group Radio Access Network; NR; NR and NG-RAN Overall Description; Stage 2 (Release 15)," Dec. 2017, 68 pages.
English Translation of Russian Office Action, issued Jan. 23, 2023, for Russian Patent Application No. 2021112813. (6 pages).
Ericsson, "NR High-Reliability URLLC scope for RAN1/RAN2," RP-172817, Agenda Item: 9.2.1, Dec. 2017, URL=https://www.3gpp.org/ftp/tsg_ran/TSG_RAN/TSGR_78/Docs/RP-172817.zip, download date Nov. 2, 2023. (6 pages).
Extended European Search Report, dated Aug. 9, 2019, for corresponding European Application No. 19000087.7-1219, 7 pages.
Extended European Search Report, dated Aug. 9, 2019, for corresponding European Application No. 19167701.2-1219, 6 pages.
Huawei, HiSilicon, Nokia, Nokia Shanghai Bell, "New SID on Physical Layer Enhancements for NR URLLC," RP-181477, Agenda Item: 9.1.9, 3GPP TSG-RAN#80, La Jolla, US, Jun. 11-14, 2018, 5 pages.
International Search Report, mailed Apr. 15, 2020, for corresponding International Application No. PCT/EP2019/086671, 14 pages.
International Search Report, mailed Apr. 20, 2020, for corresponding International Application No. PCT/EP2020/050219, 2 pages.
ITU-R, "Imt Vision—Framework and overall objectives of the future development of IMT for 2020 and beyond," Recommendation ITU-R M.2083-0, M Series, Sep. 2015, 21 pages.
Japanese Notice of Reasons for Rejection, dated Jan. 9, 2024, for Japanese Patent Application No. 2021-547297. (6 pages).
NEC, "PUCCH resource allocation prior to RRC configuration," R1-1800536, Agenda Item: 7.3.2.4, 3GPP TSG RAN WG1 Meeting AH 1801, Vancouver, Canada, Jan. 22-26, 2018. (5 pages).
NEC, "Remaining details of the DL/UL Resource allocation schemes," R1-1800537, Agenda Item: 7.3.3.1, 3GPP TSG RAN WG1 Meeting AH 1801, Vancouver, Canada, Jan. 22-26, 2018, 4 pages.
NTT Docomo, Inc., "Offline summary for AI 7.1.3.3.4 UL data transmission procedure," R1-1803295, Agenda Item: 7.1.3.3.4, 3GPP TSG RAN WG1 Meeting #92, Athens, Greece, Feb. 26-Mar. 2, 2018, 22 pages.
NTT Docomo, Inc., "Revised WID on New Radio Access Technology," RP-172115 (revision of RP-172109), Agenda Item: 9.2.1, 3GPP TSG RAN Meeting #77, Sapporo, Japan, Sep. 11-14, 2017, 11 pages.
Office Action, dispatched Jan. 19, 2023, for Indian Patent Application No. 202147036076. (5 pages).

(56) References Cited

OTHER PUBLICATIONS

Panasonic, "On PUSCH enhancements for NR URLLC," R1-1904188, Agenda Item: 7.2.6.3, 3GPP TSG RAN WG1 #96bis, Xi'an, China, Apr. 8-12, 2019. (6 pages).

Qualcomm Incorporated, "Text Proposals for DL/UL scheduling and HARQ management," R1-1801265, Agenda item: 7.3.3.2, 3GPP TSG-RAN WG1 Meeting AH 1801, Vancouver, Canada, Jan. 22-26, 2018. (3 pages).

Notice of Preliminary Rejection dated Feb. 20, 2025, for the corresponding Korean Patent Application No. 10-2021-7025928, 23 pages. (With English Translation).

3GPP TS 38.331 V15.4.0, "3rd Generation Partnership Project; Technical Specification Group Radio Access Network; NR; Radio Resource Control (RRC) protocol specification (Release 15)," Dec. 2018. (474 pages).

Nokia, Nokia Shanghai Bell, "On PUSCH enhancements for NR URLLC," R1-1900929, Agenda item: 7.2.6.1.3, 3GPP TSG RAN WG1 Ad-Hoc Meeting 1901, Taipei, Taiwan, Jan. 21-25, 2019. (13 pages).

Notice of Reasons for Refusal, dated Apr. 15, 2025, for Japanese Patent Application No. 2024-090880. (13 pages) (with English Translation).

Qualcomm Incorporated, "Summary of DL/UL scheduling and HARQ management," R1-1801247, Agenda item: 7.3.3.2, 3GPP TSG-RAN WG1 Meeting AH 1801, Vancouver, Canada, Jan. 22-26, 2018. (15 pages).

\* cited by examiner

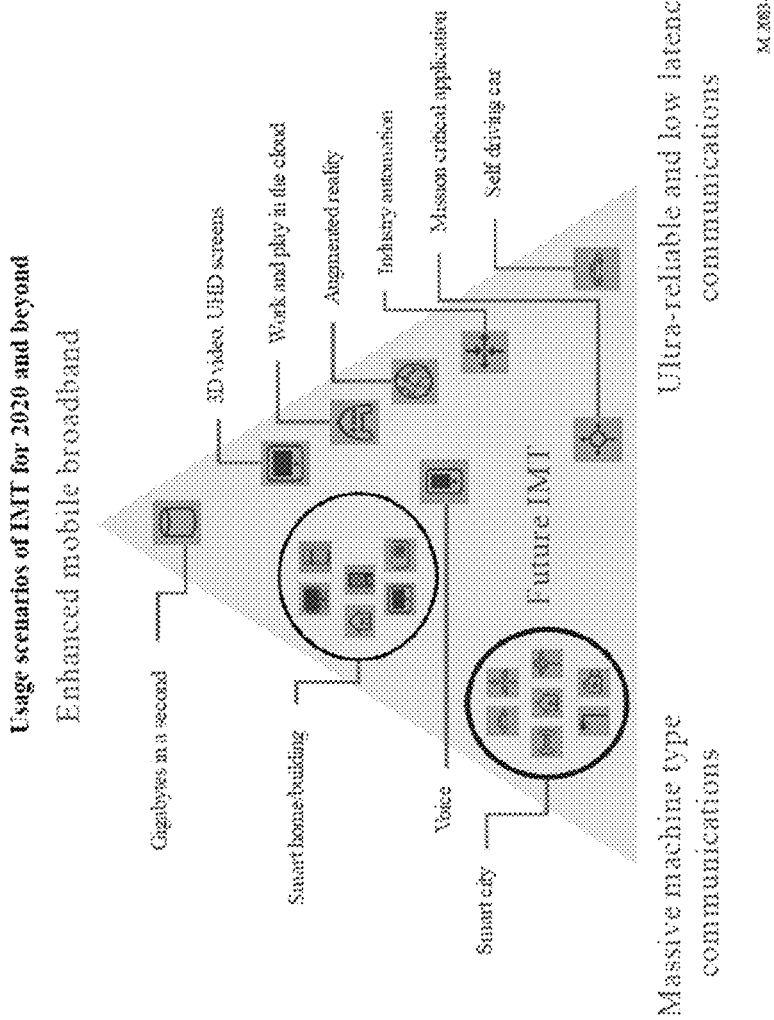

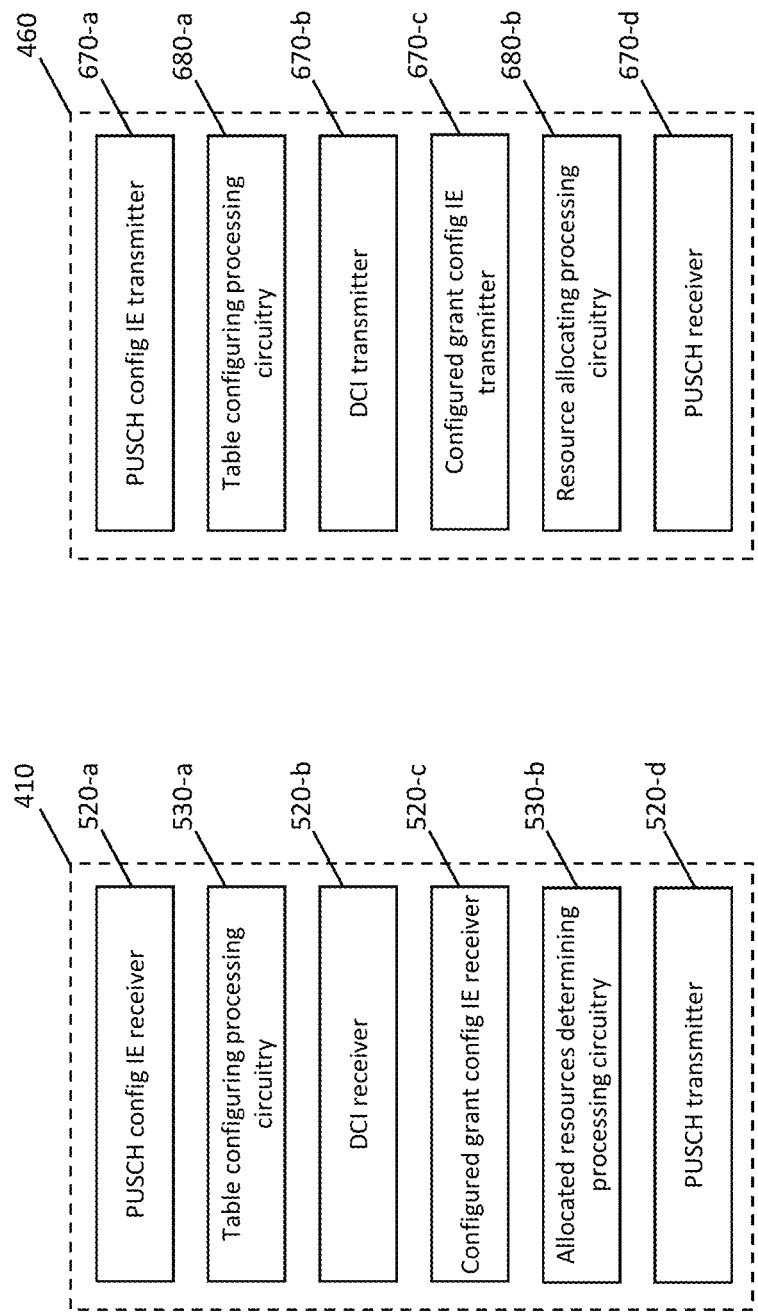

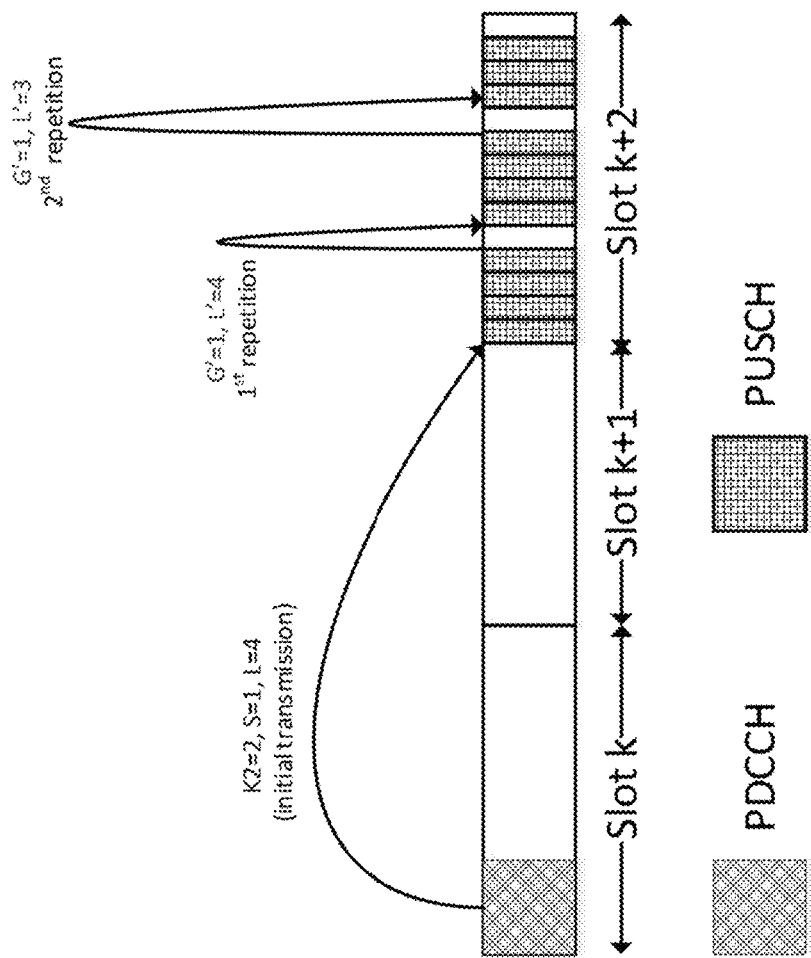

USER EQUIPMENT AND SYSTEM PERFORMING TRANSMISSION AND RECEPTION OPERATIONS

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz.

The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like.

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks.

The services eMBB and URLLC are similar in that they both demand a very broad bandwidth, however are different in that the URLLC service requires ultra-low latencies and very high reliability. In NR, the Physical layer is based on time-frequency resources (such as Orthogonal Frequency Division Multiplexing, OFDM in LTE) and supports multiple antenna operation.

For systems like LTE and NR, further improvements and options may facilitating efficient operation of the communication system as well as particular devices pertaining to the system.

BRIEF SUMMARY

One non-limiting and exemplary embodiment facilitates improving the flexibility in the support of transport block repetitions without additional signaling overhead.

In an embodiment, the techniques disclosed herein feature a user equipment, UE, comprising: a receiver, a processor, and a transmitter. The receiver, in operation, receives a physical uplink shared channel, PUSCH, config information element, IE, in form of radio resource control, RRC, signaling, the PUSCH config IE being applicable to a particular bandwidth part.

The processor, in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator.

The receiver, in operation, receives downlink control information, DCI, in form of medium access control, MAC, signaling carrying a time-domain resource assignment filed with value m, wherein the value m provides a row index m+1 to the RRC configured table.

The processor, in operation, determines allocated resources for an initial PUSCH transmission and allocated resources for at least one repetition thereof based on: a number of a slot carrying the received DCI, and the value K2 indicating the slot offsets, and the value SLIV indicating the start and length indicator comprised in indexed row of the RRC configured table;

And the transmitter, in operation, transmits a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

FIG. 3. is a schematic drawing showing usage scenarios of Massive Machine Type Communications (mMTC) and Ultra Reliable and Low Latency Communications (URLLC)

FIGS. 5-6. depict block diagrams of an exemplary implementation of the user equipment (UE) and of the base station (BS);

FIGS. 20-21. show a schematic illustration of a RRC configured table for PUSCH repetitions and corresponding resource allocations in time domain according to another usage of a third exemplary implementation.

DETAILED DESCRIPTION

As presented in the background section, 3GPP is working at the next releases for the 5th generation cellular technology, simply called 5G, including the development of a new radio (NR) access technology operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
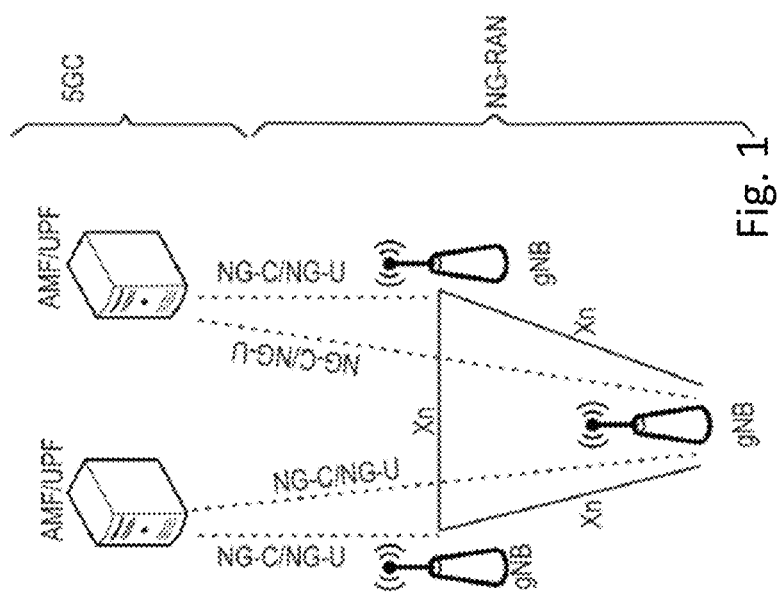
FIG. 1. illustrates a schematic drawing of an exemplary architecture for a 3GPP NR system.

Among other things, there has been a provisional agreement on the overall system architecture. The NG-RAN (Next Generation—Radio Access Network) consists of gNBs, providing the NG-radio access user plane, SDAP/PDCP/RLC/MAC/PHY (Service Data Adaptation Protocol/Packet Data Convergence Protocol/Radio Link Control/Medium Access Control/Physical) and control plane, RRC (Radio Resource Control) protocol terminations towards the UE. The NG-RAN architecture is illustrated in FIG. 1, based on TS 38.300 v.15.0.0, section 4 incorporated herein by reference. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface.

Figure 2:
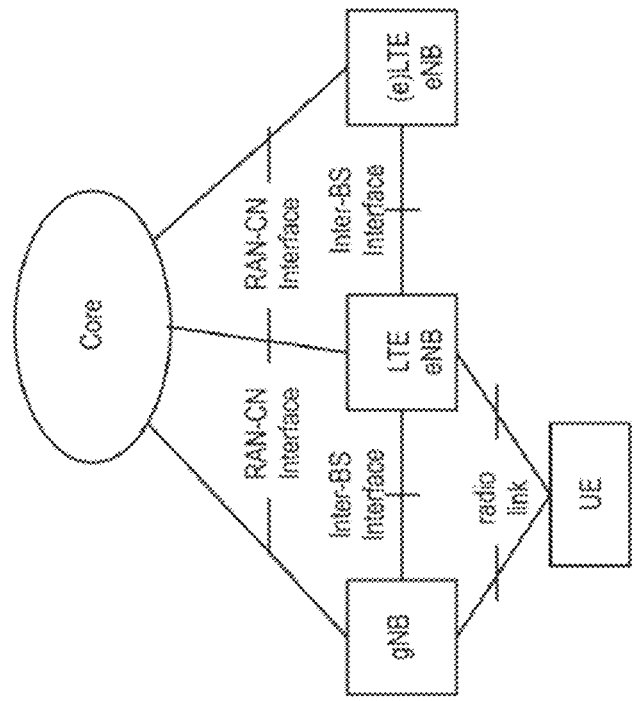
FIG. 2. shows a block diagram of an exemplary user and control plane architecture for the LTE eNB, NR gNB, and UE.

Various different deployment scenarios are currently being discussed for being supported, as reflected, e.g., in 3GPP TR 38.801 v14.0.0, "Study on new radio access technology: Radio access architecture and interfaces." For instance, a non-centralized deployment scenario (section 5.2 of TR 38.801; a centralized deployment is illustrated in section 5.4 incorporated herein by reference) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. As mentioned before, the new eNB for NR 5G may be exemplarily called gNB.

As also mentioned above, in 3rd generation partnership project new radio (3GPP NR), three use cases are being considered that have been envisaged to support wide variety of services and applications by IMT-2020 (see Recommendation ITU-R M.2083: IMT Vision-"Framework and overall objectives of the future development of IMT for 2020 and beyond," September 2015). The specification for the phase 1 of enhanced mobile-broadband (eMBB) has been concluded by 3GPP in December 2017. In addition to further extending the eMBB support, the current and future work would involve the standardization for ultra-reliable and low-latency communications (URLLC) and massive machine-type communications. FIG. 3 (from the Recommendation ITU-R M.2083) illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In the current WID (work item description) RP-172115, it is agreed to support the ultra-reliability for URLLC by identifying the techniques to meet the requirements set by TR 38.913. For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms.

From RAN1 perspective, reliability can be improved in a number of possible ways. The current scope for improving the reliability is captured in RP-172817 that includes defining of separate CQI tables for URLLC, more compact DCI formats, repetition of PDCCH, etc. However, the scope may widen for achieving ultra-reliability as the NR becomes more stable and developed (for NR URLCC key requirements, see also 3GPP TR 38.913 V15.0.0, "Study on Scenarios and Requirements for Next Generation Access Technologies" incorporated herein by reference). Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications (see also ITU-R M.2083-0).

Moreover, technology enhancements targeted by NR URLCC in Release 15 aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5 (for the technology enhancements, see also 3GPP TS 38.211 "NR; Physical channels and modulation," TS 38.212 "NR; Multiplexing and channel coding," TS 38.213 "NR; Physical layer procedures for control," and TS 38.214 "NR; Physical layer procedures for data," respective versions V15.4.0, all incorporated herein by reference).

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC Rel. 16, further use cases with tighter requirements have been identified such as factory automation, transport industry and electrical power distribution, including factory automation, transport industry, and electrical power distribution (see RP-181477, "New SID on Physical Layer Enhancements for NR URLLC," Huawei, HiSilicon, Nokia, Nokia Shanghai Bell, incorporated herein by reference). The tighter requirements are higher reliability (up to 10-6 level), higher availability, packet sizes of up to 256 bytes, time synchronization down to the order of a few us where the value can be one or a few us depending on frequency range and short latency in the order of 0.5 to 1 ms in particular a target user plane latency of 0.5 ms, depending on the use cases (see also 3GPP TS 22.261 "Service requirements for next generation new services and markets" V16.4.0, incorporated herein by reference and RP-181477).

Moreover, for NR URLCC in Rel. 16, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In general, TTI determines the timing granularity for scheduling assignment. One TTI is the time interval in which given signals is mapped to the physical layer. Conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.4.0, incorporated herein by reference). However, assignment of time resources for transmission may also be non-slot based. In particular, the TTIs in non slot-based assignment may correspond to mini-slots rather than slots. E.g., one or more mini-slots may be assign to a requested transmission of data/control signaling. In non slot-based assignment, the minimum length of a TTI may conventionally be 2 OFDM symbols.

Other identified enhancements are related to scheduling/HARQ/CSI processing timeline and to UL inter-UE Tx prioritization/multiplexing. Further identified are UL configured grant (grant free) transmissions, with focus on improved configured grant operation, example methods such as explicit HARQ-ACK, ensuring K repetitions and mini-slot repetitions within a slot, and other MIMO (Multiple Input, Multiple Output) related enhancements (see also 3GPP TS 22.261 V16.4.0).

The present disclosure is related to the potential layer 1 enhancements for further improved reliability/latency and for other requirements related to the use cases identified in (RP-181477, "New SID on Physical Layer Enhancements for NR URLLC," Huawei, HiSilicon, Nokia, Nokia Shanghai Bell). Specifically, enhancements for PUSCH (Physical Uplink Shared CHannel) repetition are discussed. The impact of the proposed ideas in this disclosure is expected to be on PUSCH repetition enhancements which is within the main scope of new SI (study items)/WI (work items) on NR URLLC in Rel. 16.

PUSCH Repetition

One of the scopes for potential enhancements is related to mini-slot repetition of PUSCH within slot. In the following, a motivation for supporting repetition of PUSCH within a slot which may allow for potential enhancements to the repetition mechanism for further improving the reliability and/or latency to satisfy the new requirements of NR URLLC, is provided.

To achieve the latency requirement for URLLC PUSCH transmission, one-shot transmission (i.e., single (TTI) assignment) is ideal, provided the reliability requirement is satisfied. However, it is not always the case that the target BLER of 1E-6 is achieved with one-shot transmission. Therefore, retransmission or repetition mechanisms are required.

In NR Rel.15, both retransmissions and repetitions are supported to achieve the target BLER, when one-shot transmission is not enough. HARQ-based retransmission is well known to improve the overall reliability, by using the feedback information and improving the subsequent retransmissions according to the channel conditions. However, they suffer from additional delay due to feedback processing timeline. Therefore, repetitions are useful for highly delay-tolerant services, as they do subsequent transmission of the same transport blocks without waiting for any feedback.

A PUSCH repetition can be defined as "transmitting a same transport block more than once, without waiting for any feedback of previous transmission(s) of the same transport block." Advantages of PUSCH retransmissions are an improvement in the overall reliability and a reduction in latency in comparison with HARQ, as no feedback is required. However, in general, no link adaptation is possible, and resource usage may be inefficient.

In NR Rel. 15, limited support for repetitions is introduced. Only semi-static configurations of repetitions are allowed. Moreover, repetitions are allowed only between slots (slot level PUSCH repetition). A repetition is only possible in the slot following the slot of the previous transmission. Depending up on the numerology and service type (e.g., URLCC, eMBB), latency between the repetitions can be too long for inter-slot repetition.

Such limited support of repetition is mainly useful for PUSCH mapping type A. This PUSCH mapping type A only allow PUSCH transmissions starting from the beginning of the slot. With repetitions, this would result in an initial PUSCH transmission and each repetition stating at the beginning of plural consecutive slots.

Less useful is the limited support of repetition for a PUSCH mapping type B. PUSCH mapping type B allows PUSCH transmissions to start at any symbol within a slot. With repetitions, this would result in an initial PUSCH transmission and each repetition starting within a slot, at a same symbol of plural consecutive slots.

In any case, such limited support may not be able to achieve stricter latency requirements in NR Rel. 15, i.e., up to 0.5 ms latency. This would require mini-slot repetitions. Additionally, the limited support of repetitions does also not exploit the benefits resulting from mini-slots, namely, transmission time intervals (TTIs) including a smaller number of symbols than a slot (a slot comprising fourteen symbols).

Generic Scenario for Uplink

Considering the above, the authors of the present disclosure have recognized that there is a need for more flexible support of repetitions, namely for a mechanism which is not restricted to repetitions which are staring at a same symbol in consecutive slots, be it the first symbol at the beginning of a slot for PUSCH mapping type A or be it any other symbol within the slot for PUSCH mapping type B.

At a same time, the more in flexibility shall not come at the expense of additional signaling overhead. In other words, the authors of the present disclosure have recognized that the flexible support of repetitions shall not require additional (dynamic) signaling scheduling each initial PUSCH transmission. Rather, the signaling mechanism, e.g., in form of downlink control information (DCI), shall stay the same, thereby avoiding any additional signaling overhead when scheduling the repetitions.

It is therefore a proposal of the present disclosure that transport block (TB) repetitions shall be supported with flexible timings which do not necessarily create additional signaling overhead. The following disclosure have been presented with a focus on uplink transmissions. Nevertheless, this shall not be construed as a limitation since the concepts disclosed herein can equally be applied to downlink transmissions.

Figure 4:
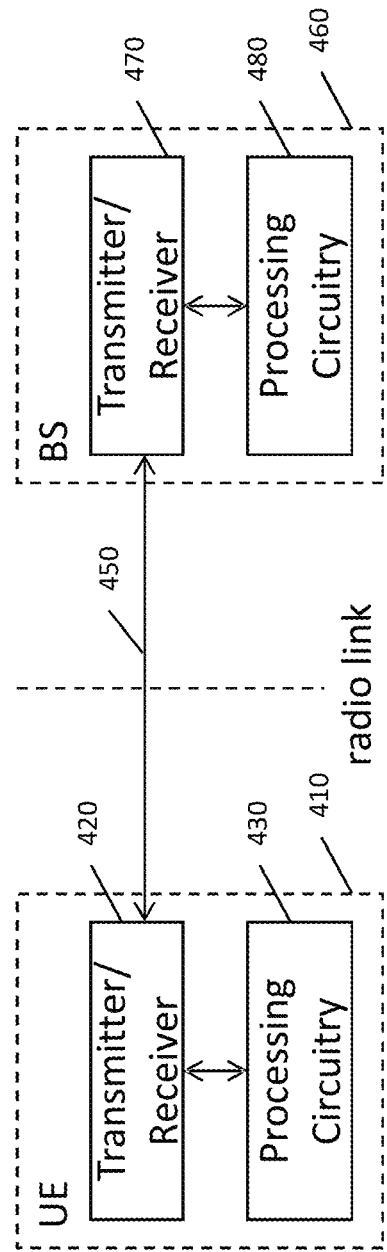
FIG. 4. shows a communication system in NR including a user equipment (UE) and a base station (BS) according to an exemplary scenario.

FIG. 4 shows an exemplary communication system including a user equipment (UE) 410 and a base station (BS) 460 in a wireless communication network. Such communication system may be a 3GPP system such as NR and/or LTE and/or UMTS. For example, as illustrated in the figure, the base station (BS) may be a gNB (gNodeB, e.g., an NR gNB) or an eNB (eNodeB, e.g., an LTE gNB). However, the present disclosure is not limited to these 3GPP systems or to any other systems.

Even though the embodiments and exemplary implementations are described using some terminology of 3GPP systems, the present disclosure is also applicable to any other communication systems, and in particular in any cellular, wireless and/or mobile systems.

Rather, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

A mobile terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station (BS) forms at least part of a system of interconnected units, for instance a (central) baseband unit and different radio frequency units, interfacing different antenna panels or radio heads in the network for providing services to terminals. In other words, a base station provides wireless access to terminals.

Referring back to the figure, the user equipment 410 comprises processing circuitry (or processor) 430 and a transmitter/receiver (or transceiver) 420 which are indicated as separate building blocks in the diagram. Similarly, base station 460, comprises processing circuitry (or processor) 480 and a transmitter/receiver (or transceiver) 470, which are indicated as separate building blocks in the diagram. The transmitter/receiver 420 of the user equipment 410 is communicatively coupled via a radio link 450 with the transmitter/receiver 470 of the base station 460.

FIGS. 5 and 6 depict exemplary implementations of the building blocks of the user equipment 410 and of the base station 460, respectively. The user equipment 410 of the exemplary implementation comprises a PUSCH config IE receiver 520-*a*, a table configuring processing circuitry 530-*a*, a DCI receiver 520-*b*, a configured grant config IE receiver 520-*c*, an allocated resources determining processing circuitry 530-*b*, and a PUSCH transmitter 520-*d*.

Similarly, the base station 460 of the exemplary implementation comprises a PUSCH config IE transmitter 570-*a*, a table configuring processing circuitry 580-*a*, a DCI transmitter 570-*b*, a configured grant config IE transmitter 570-*c*, a resource allocating processing circuitry 580-*b*, and PUSCH receiver 570-*d*.

In general, the present disclosure assumes that the user equipment 410 is in communication reach of the base station 460 and is configured with at least one bandwidth part in the downlink and at least one bandwidth part in the uplink. The bandwidth parts are located within the carrier bandwidth served by the base station 460.

Further, the present disclosure assumes that the user equipment 410 is operating in a radio resource control, RRC, connected state (termed: RRC_CONNECTED), thereby capable of receiving in the downlink data and/or control signals from the base station 460 and capable of transmitting in the uplink data and/or control signals to the base station 460.

Before performing PUSCH repetitions as suggested in the present disclosure, the user equipment 410 receives control messages as defined in the radio resource control, RRC, and the medium access control, MAC, protocol layer. In other words, the user equipment 410 employs signaling mechanism which is readily available in the different protocol layers of the various communication technologies.

In general, a substantial difference is made between control messages defined in RRC and those defined in MAC. This difference becomes already aware from the fact that RRC control messages are usually used for configuration of radio resources (e.g., radio link) on a semi-static basis whereas MAC control messages are used for dynamically defining each medium access (e.g., transmission) separately. From this, it directly follows that RRC control occurs less frequently than MAC control.

Accordingly, an excessive MAC control signaling overhead can substantially impair the communication system performance whereas the RRC control message have been treated more leniently in standardization. In other words, MAC control signaling overhead is a well-recognized constraint to the system performance.

For this reason the conventional mechanisms of PUSCH repetitions relies on pre-specified (e.g., in the relevant standard fixedly prescribed) timing relations between the initial PUSCH transmission and the repetitions thereof. In other words, the risk of an impaired system performance was found to outbalance the benefits from a more flexible use of PUSCH repetitions.

Considering the above, the authors of the present disclosure propose a mechanism which overcomes the disadvantages of conventional mechanisms and permits flexible transport block (TB) repetitions, while—at a same time—avoiding signaling overhead.

In the context of the disclosure, the term "transport block" is to be understood as data unit of an uplink and/or downlink transmission. For example, it is widely understood that the term "transport block" is equivalent to a MAC layer packed data unit, PDU. Thus, the transmission of transport block is equally understood as a physical uplink shared channel (PUSCH) and/or physical downlink shared channel (PDSCH) transmission.

Particularly, since PUSCH and/or PDSCH transmissions generally carry payload, the present disclosure shall refer to PUSCH and/or PDSCH transmissions carrying a MAC PDU. In other words, the terms "PUSCH and/or PDSCH transmissions" shall be understood as describing MAC PDU transmission on PUSCH and/or PDSCH.

Figure 7:
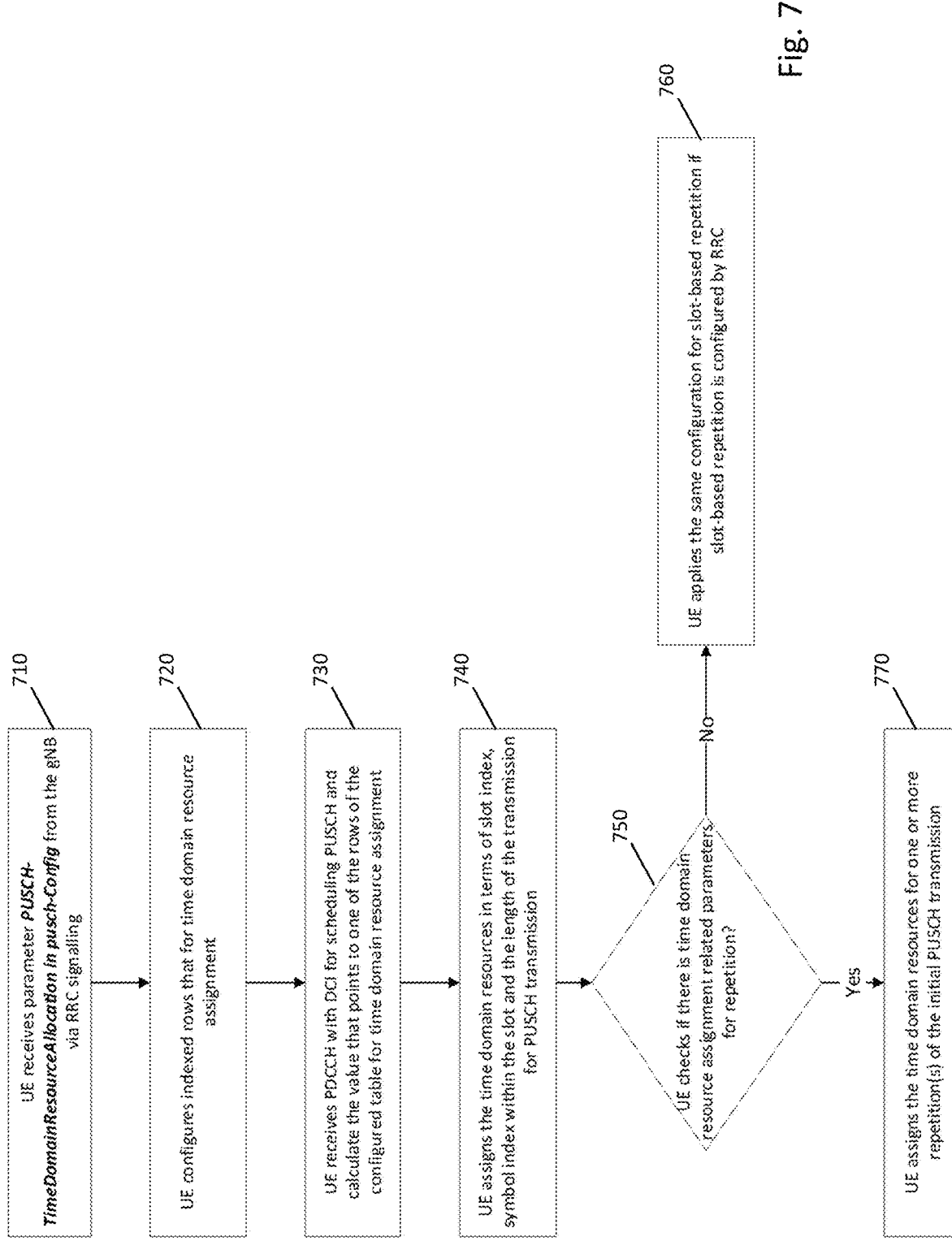
FIG. 7. illustrates a sequence diagram of a user equipment performing PUSCH repetitions according to an exemplary mechanism.

Referring to FIG. 7, a generic scenario is described with regard to performing PUSCH repetitions based on a dynamic grant, namely a DCI carrying a time-domain resource assignment filed, such as, for example, a DCI of DCI format 0-0 or of DCI format 0-1.

This description shall, however, not be understood as a restriction to the present disclosure to only extend to PUSCH transmissions, more specifically to repetitions thereof. Rather, it will become apparent that the concepts disclosed herein can equally be applied to downlink transmissions The receiver 420 of the user equipment 410 receives (see, e.g., step 710-FIG. 7) a physical uplink shared channel, PUSCH, config information element, IE. This PUSCH config IE is received in form of radio resource control, RRC, signaling and applicable to a particular bandwidth part. The PUSCH config IE is received from the base station 460 serving the particular bandwidth part. For example, this reception operation may be performed by the PUSCH config IE receiver 520-a of FIG. 5.

The PUSCH config IE carries among others a list of parameters in form of an information element (IE) termed "PUSCH-TimeDomainResourceAllocationList," wherein each parameter of the list of parameters is termed "PUSCH-TimeDomainResourceAllocation,"

Then, the processor 430 of the user equipment 410 configures (see, e.g., step 720—FIG. 7) a table which is defined by the PUSCH time domain resource allocation list IE carried in the received PUSCH config IE. The table comprises rows, each with a value indicating a PUSCH mapping type, a value $K_2$ indicating a slot offsets, and a value SLIV indicating a start and length indicator. For example, this configuration operation may be performed by the table configuring processing circuitry 520-a of FIG. 5.

In an exemplary implementation, each row of the RRC configure table corresponds to one of plural parameters termed "PUSCH-TimeDomainResourceAllocation" of the list of parameters termed "PUSCH-TimeDomainResourceAllocationList." This shall, however, not be understood as a limitation to the present disclosure, as apparent from the following alternative.

Also scenarios different from the exemplary implementation are conceivable, namely where some rows of the configured table correspond to respective parameters comprised in the IE with the list of parameters, and other rows are configured complying with a set of pre-specified rules readily applying the principles laid out PUSCH time domain resource allocation list IE.

This shall, however, not distract from the fact that the RRC configured table in its entirety is defined by the PUSCH time domain resource allocation list IE.

Subsequently, the receiver 420 of the user equipment 410 receives (see, e.g., step 730—FIG. 7) downlink control information, DCI, in form of medium access control, MAC, signaling. The DCI is carrying a time-domain resource assignment filed with value m, wherein the value m provides a row index m+1 to the configured table. For example, this reception operation may be performed by the DCI receiver 520-b of FIG. 5.

In the context of the present disclosure, this DCI is carrying an uplink grant since it serves the purpose of triggering PUSCH repetitions. In this respect, the received DCI is in DCI format 0-0 or in DCI format 0-1. In this respect, the described scenario refers to situation where the PUSCH repetitions are scheduled by a dynamic grant.

This shall, however, not be understood as limitation to the present disclosure, as the concepts disclosed herein are equally applicable to a configure grant or grant free scheduling technique. A detailed description of this grant free scheduling technique is given as an alternative to the mechanism depicted in FIG. 7.

Subsequently, the processor 430 of the user equipment 410 determines allocated resources for an initial PUSCH transmission and also allocated resources for at least one repetition of the initial PUSCH transmission. For sake of clarity and brevity, the following description focusses on the allocation of resources in time domain. For example, this determination operation may be performed by the allocated resources determining processing circuitry 530-b of FIG. 5.

The resources to be used by the user equipment 410 for the initial PUSCH transmission and the repetition(s) thereof have been previously allocated by the base station 460. In this context, the processor 430 accordingly determines which of the previously allocated resource it shall use for the PUSCH transmission and the repetition(s) thereof.

As part of this determination operation, the processor 430 at first determines (see, e.g., step 740—FIG. 7) the allocated resources for the initial PUSCH transmission based on: (i) a number of a slot carrying the received DCI, and (ii) the value $K_2$ indicating the slot offsets, and (iii) the value SLIV indicating the start and length indicator comprised in indexed row of the RRC configured table. This implies that the processor 430 has previously determined that the value indicating the PUSCH mapping type indicates a type B mapping.

For example, let us assume the received DCI was carried in a slot which has the number k, and further the DCI has a time-domain resource assignment filed with value m. Then, the processor, for the initial PUSCH transmission, reverts to the RRC configured table in row with row index m+1 and uses the respective values $K_2$ indicating the slot offsets, and SLIV indicating the start and length indicator. With these value, the processor determines that the allocated resources, for the initial PUSCH transmission, are included in a slot with a number of $k+K_2$, and have a start and length in terms of symbols of this slot corresponding to the value SLIV.

When determining the allocated resources, the processor 430 also uses the value indicating the PUSCH mapping type additionally comprised in the row of the RRC configured table with row index m+1. Particularly, in case the value indicates a type A PUSCH mapping, the processor 430 only uses the length of the value SLIV indicating a start and length indicator. In case the value indicates a type B PUSCH mapping, the processor 430 uses both the start and the length of the value SLIV indicating the start and length indicator.

As part of this determination operation, the processor 430 then determines allocated resources for the at least one repetition of the initial PUSCH transmission. For this, the processor 430 checks (see, e.g., step 750—FIG. 7) if there is an (explicit) time domain resource assignment related to parameters (e.g., the timing) for the repetition. For this, the processor 430 reverts to the row with row index m+1 and checks whether or not this row comprises additional values (e.g., at least one value) which are specifying the allocated resource in time domain for the at least one repetition of the initial PUSCH transmission.

In case the check is negative, the processor 430 uses (see, e.g., step 760—FIG. 7) a conventional slot-based repetition mechanism for the repetition of the initial PUSCH transmission. In other words, the processor 430 relies on pre-specified (e.g., in the relevant standard fixedly prescribed) timing relations between the initial PUSCH transmission and the repetitions thereof. For example, this results in an initial PUSCH transmission and each repetition starting at a same symbol and having a same symbol length of plural consecutive slots.

Referring back to the example, the processor 430, for the at least one repetition, reverts to the row with row index m+1 of the RRC configured table, and determines that the allocated resources, for the first repetition of the initial PUSCH transmission, are included in a slot with number $k+K_2+1$ (where 1 is a pre-defined constant fixed by standardization), and have a start and length in terms of symbols of this slot corresponding to the same value SLIV.

Should there be a second repetition, the processor 430 that the allocated resources, for the second repetition of the initial PUSCH transmission, are included in a slot with number $k+K_2+2$ (where 2 is again a pre-defined constant fixed by standardization), and have a start and length in terms of symbols of this slot corresponding to the same value SLIV as already the initial PUSCH transmission and the first repetition thereof. Further repetitions follow at contiguous slots.

Further to this example, when assuming that the PUSCH mapping type indicted in the row with row index m+1 is type B, and when assuming that the value SLIV indicates a start at symbol 4 and a length of 4 symbols, then the processor 430 determines that each one of the initial, the first repetition and the second repetition of the PUSCH transmission have resources corresponding to symbol 4, symbol 5, symbol 6 and symbol 7 in the slots with number $k+K_2$, number $k+K_2+1$, number $k+K_2+2$, respectively. Evidently, these allocated resources as determined by the processor 430 cannot be flexibly configured. This is overcome by the alternative determination by the processor 430.

In case the check is positive, the processor 430 uses (see, e.g., step 770—FIG. 7) the additional values (e.g., at least one value) comprised in the indexed row of the RRC configure table for determining allocated resources for the repetition of the initial PUSCH transmission. In other words, the comprised at least one additional value is specifying the allocated resource in time domain for the repetition of the initial PUSCH transmission.

It shall be emphasized in this context that the at least one additional value is comprised in a row of the RRC configured table which is defined by the PUSCH time domain resource allocation list IE. In other words, since the (entire) RRC configure table is defined by the PUSCH time domain resource allocation list IE, then also the at least one additional value comprised therein is defined by the PUSCH time domain resource allocation list IE.

To meet this constrains, the at least one additional value could be (directly) prescribed by a parameter comprised in the PUSCH time domain resource allocation list IE, or alternatively the at least one additional value could be (indirectly) inferred from related parameters comprised in the PUSCH time domain resource allocation list IE. In any case, the at least one additional value specifies in time domain the repetition of the initial PUSCH transmission.

It is important to realize that the processor 430 of the user equipment 410 uses additional values from the indexed row of the RRC configured table for determining the allocated resources for the repetitions. This approach substantially differs from the conventional slot-based repetition mechanism for the following reasons:

Firstly, the at least one additional value comes from a row of the RRC configured table which is (actively) indexed by the row index m+1 derived from value m in the time-domain resource assignment field of the received DCI. In this respect, a varying index values m in the in the time-domain resource assignment field of the received DCI permit a varying at least one additional values to be used for determining the allocated resources for the at least one repetition of the initial PUSCH transmission. Thereby, the flexibility of such allocated resources is increased.

Secondly, the at least one additional value comes from a (same) row of the RRC configured table which is (already) indexed by the row index m+1 derived from value m in the time-domain resource assignment field of the received DCI. In this respect, no additional index value is required than then index value m in the in the time-domain resource assignment field of the received DCI when determining the allocated resources for the repetition of the at least one repetition of the initial PUSCH transmission. Thereby, any additional signaling overhead is avoided.

Consequently, this permits increasing flexibility while avoiding signaling overhead, namely by the processor 430 of the user equipment 410 using the at least one additional value from the indexed row of the RRC configured table for determining the allocated resources for the repetitions.

Finally, the transmitter 420 of the user equipment 410 transmits (not depicted in FIG. 7) a PUSCH transmission using the respectively determined allocated resources for the initial PUSCH transmission and for the at least one repetition thereof. For example, this transmission operation may be performed by the PUSCH transmitter 520-d of FIG. 5.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling. The PUSCH config IE being applicable to a particular bandwidth part. For example, this transmission operation may be performed by the PUSCH config IE transmitter 670-a of FIG. 6.

Then, the processor 480 of the base station 460 configures a table which is defined by a PUSCH time domain resource allocation list IE carried in the received PUSCH config IE. The RRC configured table comprises rows, each with a value indicating a PUSCH mapping type, a value $K_2$ indicating a slot offsets, and a value SLIV indicating a start and length indicator. For example, this configuration operation may be performed by the table configuring processing circuitry 680-a of FIG. 6.

Subsequently, the transmitter 470 of the base station 460 transmits downlink control information, DCI, in form of medium access control, MAC, signaling carrying a time-domain resource assignment filed with value m, wherein the value m provides a row index m+1 to the RRC configured table. For example, this transmission operation may be performed by the DCI transmitter 670-b of FIG. 6.

The processor 480 of the base station 460 allocates resources for an initial PUSCH transmission and allocates resources for at least one repetition thereof based on: (i) a number of a slot carrying the transmitted DCI, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this resource allocation operation may be performed by the resource allocating processing circuitry 680-b of FIG. 6.

Finally, a receiver 470 of the base station 460 receives a PUSCH transmission using the respectively allocated resources for the initial PUSCH transmission and for the at least one repetition thereof. For example, this reception operation may be performed by the PUSCH receiver 670-d of FIG. 6.

Now, a generic scenario is described with regard to performing PUSCH repetitions based on a configured grant (or grant free), namely a configured grant config IE received in form of RRC signaling, and also comprising a PUSCH time domain resource allocation list IE.

The receiver 420 of the user equipment 410 receives a physical uplink shared channel, PUSCH, config information element, IE, in form of radio resource control, RRC, signaling. The PUSCH config IE is applicable to a particular bandwidth part. The PUSCH config IE is received from the base station 460 serving the particular bandwidth part. For example, the reception operation may be performed by the PUSCH config IE receiver 520-a of FIG. 5.

Then, the processor 430 of the user equipment 410 configures a table which is defined by a PUSCH time domain resource allocation list IE carried in the received PUSCH config IE. The RRC configured table comprises rows, each with a value indicating a PUSCH mapping type, a value $K_2$ indicating a slot offset, and a value SLIV indicating a start and length indicator. For example, this configuration operation may be performed by the table configuring processing circuitry 530-a of FIG. 5.

Subsequently, the receiver 420 of the user equipment 410 receives a configured grant config IE in form of RRC signaling carrying a time domain allocation filed with value m, wherein the value m provides a row index m+1 to the configured table. For example, this reception operation may be performed by the configured grant config IE receiver 520-c of FIG. 5.

The processor 430 of the user equipment 410 determines allocated resources for an initial PUSCH transmission and allocated resources for at least one repetition thereof based on: (i) a value of time domain offset field additionally carried in the received configured grant config IE and associated with the time domain allocation filed, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this determination operation may be performed by the allocated resources determining processing circuitry 530-b.

Finally, the transmitter 420 of the user equipment 410 transmits a PUSCH transmission using the respectively determined allocated resources for the initial PUSCH transmission and for the at least one repetition thereof. For example, this transmission operation may be performed by the PUSCH transmitter 530-d of FIG. 5.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling, the PUSCH config IE being applicable to a particular bandwidth part. For example, this transmission operation may be performed by the PUSCH config IE transmitter 670-a of FIG. 6

Then, the processor 480 of the base station 460 configures a table which is defined by a PUSCH time domain resource allocation list IE carried in the received PUSCH config IE. The RRC configured table comprises rows, each with a value indicating a PUSCH mapping type, a value $K_2$ indicating a slot offsets, and a value SLIV indicating a start and length indicator. For example, this configuration operation may be performed by the table configuring processing circuitry 680-a of FIG. 6.

Subsequently, the transmitter 470 of the base station 460 transmits a configured grant config IE in form of RRC signaling carrying a time domain allocation filed with value m, wherein the value m provides a row index m+1 to the RRC configured table. For example, this transmission operation may be performed by the configured grant config IE transmitter 670-c of FIG. 6.

The processor 480 of the base station 460 allocates resources for an initial PUSCH transmission and allocates resources for at least one repetition thereof based on: (i) a value of time domain offset field additionally carried in the received configured grant config IE and associated with the time domain allocation filed, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this resource allocation operation may be performed by the resource allocating processing circuitry 680-*b* of FIG. 6.

Finally, the receiver 470 of the base station 460 receives a PUSCH transmission using the respectively determined allocated resources for the initial PUSCH transmission and for the at least one repetition thereof. For example, this reception operation may be performed by the PUSCH receiver 670-*d* of FIG. 6.

Generic Scenario for Downlink

As already mentioned above, the present disclosure is not limited to transport block (TB) repetitions in the uplink but can equally be applied to downlink transmissions, namely to achieve a flexible support of repetitions in the downlink. Also here, transport block (TB) repetitions are supported with flexible timings which do not create additional signaling overhead.

In other words, the benefit of an improved flexibility when scheduling transport block repetitions are not only achievable for physical uplink shared channel (PUSCH) transmissions, but are equally achievable for physical downlink shared channel (PDSCH) transmissions. This directly follows from the high degree of similarity between the PUSCH-Time Domain Resource Allocation List information element (IE), and the PDSCH-Time Domain Resource Allocation List IE.

Also, no additional signaling overhead is created since the scheduling described henceforth relies on the PDSCH-Time Domain resource allocation field in DCI Format 1-0 or 1-1, which is highly similar to the on the PUSCH-Time Domain Resource Allocation field in DCI format 0-0 or 0-1 discussed before.

In general, the receiver 420 of the user equipment 410 receives a physical downlink shared channel, PDSCH, config information element, IE, in form of radio resource control, RRC, signaling. The PDSCH config IE is applicable to a particular bandwidth part which is served by the base station 460.

Then, the processor 430 of the user equipment 410 configures a table which is defined by a PDSCH time domain resource allocation list IE carried in the received PDSCH config IE. The RRC configured table comprising rows, each with a value indicating a PDSCH mapping type, a value $K_2$ indicating a slot offsets, and a value SLIV indicating a start and length indicator.

Subsequently, the receiver 420 of the user equipment 410 receives downlink control information, DCI, in form of medium access control, MAC, signaling carrying a time-domain resource assignment filed with value m, wherein the value m provides a row index m+1 to the RRC configured table.

The processor 430 of the user equipment 410 determines allocated resources for an initial PDSCH transmission and allocated resources for at least one repetition thereof based on: (i) a number of a slot carrying the received DCI, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PDSCH transmission.

Finally, the receiver 420 of the user equipment 410 receives a PDSCH transmission using the respectively determined allocated resources for the initial PDSCH transmission and for the at least one repetition thereof.

First Exemplary Implementation

The following first exemplary implementation is conceived with the understanding that the at least one additional value, comprised in the indexed row of the RRC configured table, is at least one of a value $K_2'$ indicating a second slot offset for the at least one repetition, a value SLIV' indicating a second start and length indicator value for the at least one repetition, and optionally a value indicating the number of the at least one repetition.

In particular, the second start and length indicator value SLIV' comprises: a value S' indicating a symbol number specifying the start of the allocated resources for the at least one repetition, and a value L' indicating a number of symbols specifying the length of the allocated resources for the at least one repetition.

With this understanding, the RRC configured table comprises not only values which are specifying allocated resources for the initial PUSCH transmission. Rather the RRC configured table comprises additional values $K_2'$ and/or SLIV' which are specifying allocated resources for the repetition of the initial PUSCH transmission. In addition, the optional additional value indicating the number of the least one repetition further complements the RRC configured table in that it permits a more flexible determination as to which of the specified allocated resource are to be used for repetitions.

In particular, in the first exemplary implementation, the RRC configured table comprises rows, each with a value indicating a PUSCH mapping type, a value $K_2$ indicating a slot offsets for the initial PUSCH transmission, a value SLIV indicating a start and length indicator for the initial PUSCH transmission, as additional values, a value $K_2'$ indicating a second slot offset for the at least one repetition, a value SLIV' indicating a second start and length indicator value for the at least one repetition.

An example of such a RRC configured table is reproduced herein below, namely as table 1:

TABLE 1

| DCI Row index | PUSCH mapping type | K2 | S | L | {K2'}, {S'}, {L'} |
|---|---|---|---|---|---|
| 1 | Type A | K2_1 | S_1 | L_1 | {K2'_1_1, K2'_1_2, ... K2'_1_n}, {S2'_1_1, S2'_1_2, ... S2'_1_n}, {L2'_1_1, L2'_1_2, ... L2'_1_n} |

TABLE 1-continued

| DCI Row index | PUSCH mapping type | K2 | S | L | {K2'}, {S'}, {L'} |
|---|---|---|---|---|---|
| 2 | Type B | K2_2 | S_2 | L_2 | {K2'_2_1, K2'_2_2, ... K2'_2_n}, {S2'_2_1, S2'_2_2, ... S2'_2_n}, {L2'_2_1, L2'_2_2, ... L2'_2_n} |
| ... | ... | ... | ... | ... | ... |
| 16 | ... | ... | ... | ... | ... |

In this exemplary table 1, the values SLIV and SLIV' are each shown to comprise: a value S and S' indicating a symbol number specifying the start of the allocated resources, and a value L and L' indicating a number of symbols specifying the length of the allocated resources.

In particular, the RRC configured table not only comprises one set of additional values $K_2'$ and SLIV', or better $K_2'$, S' and L', but instead comprises such a set of additional values for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 1. As the terminology may change in the future, this example shall be more broadly understood with regard to its functions and concepts of signaling the additional parameters comprised in a PUSCH time domain resource allocation list IE.

EXAMPLE 1

ASN.1 Notation OF
"PUSCH-TIMEDOMAINRESOURCE-
ALLOCATIONLIST IE"

```
-- ASN1START
-- TAG-PUSCH-TIMEDOMAINRESOURCEALLOCATIONLIST-START
PUSCH-TimeDomainResourceAllocationList : :=        SEQUENCE (SIZE(1..maxNrofUL-
Allocations)) OF PUSCH-TimeDomainResourceAllocation
PUSCH-TimeDomainResourceAllocation : := SEQUENCE {
  k2                              INTEGER(0..32) OPTIONAL, -
- Need S
    mappingType                   ENUMERATED {typeA, typeB},
    startSymbolAndLength          INTEGER (0..127)
    numberOfRIVassignments        INTEGER(0..n)
    RIVassignment                 SEQUENCE{
       k2'                        INTEGER(0..32)
       startSymbolAndLength'      INTEGER(0..127)
    }
}
-- TAG-PUSCH-TIMEDOMAINRESOURCEALLOCATIONLIST-STOP
-- ASN1STOP
```

As can be seen from this example 1, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of resource indicator value, RIV, assignments), and for each of the repetitions (termed RIV assignments), a value $K_2'$ indicating a second slot offset for the at least one repetition, a value SLIV' indicating a second start and length indicator value for the at least one repetition.

When comparing the PUSCH time domain resource allocation list IE of example 1 with the RRC configure table of table 1, it can be seen that the value indicating the number of repetitions (termed number of RIV assignments) of the IE is only indirectly reflected in the RRC configured table, namely in form of the total number of each of the values $K_2'$, S' and L'. This value may, however, also be directly included in the RRC configured table.

The additional values shall be explained in further detail with respect to the different usages of the first exemplary implementation as depicted in FIGS. 8-13.

One Usage of the First Exemplary Implementation

Figures 8, 9:
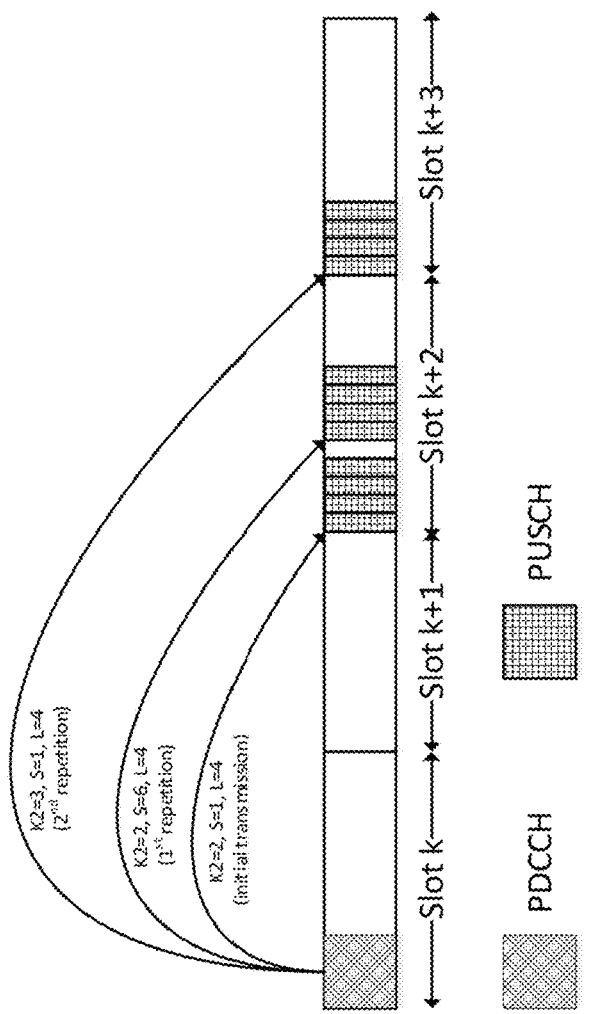
FIGS. 8-9. show a schematic illustration of a RRC configured table for PUSCH repetitions and corresponding resource allocations in time domain according to a usage of a first exemplary implementation.

One usage of the RRC configured table of the first exemplary implementation is depicted in FIGS. 8-9 where an exemplary RRC configured table for PUSCH repetitions is given and corresponding resource allocations in time domain are shown according to a usage of a first exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for the first and second repetition of the initial PUSCH transmission are included in slots relative to the value k corresponding to the number of the slot carrying the received DCI, or corresponding to the value of time domain offset field additionally carried in the received configured grant config IE.

Thus, the allocated resources for the first and second repetition are included in the slots with slot numbers k+2 and k+3, respectively. Additionally two values S' and two values L' are comprised indicating that the allocated resources for the first and second repetition of the initial PUSCH transmission start in the respective slot with slot number k+2 and k+3 at the symbol with symbol numbers 6 and 1, respectively. The respective resource allocations in time domain are also shown.

Another Usage of the First Exemplary Implementation

Figures 10, 11:
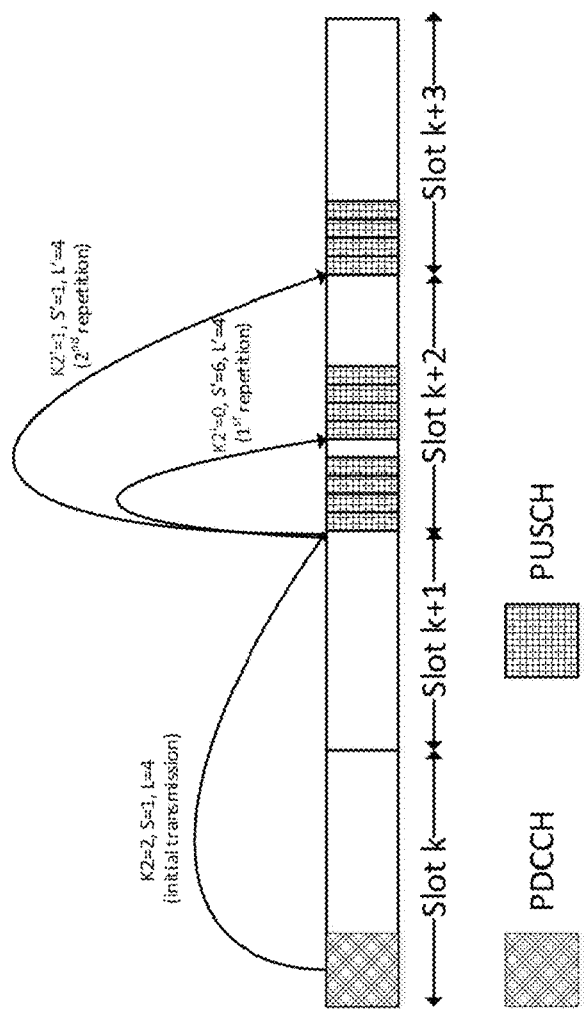
FIGS. 10-11. show a schematic illustration of a RRC configured table for PUSCH repetitions and corresponding resource allocations in time domain according to another usage of the first exemplary implementation.

Another usage of the RRC configured table of the first exemplary implementation is depicted in FIGS. 10-11 where an exemplary RRC configured table for PUSCH repetitions is given and corresponding resource allocations in time domain are shown according to a usage of a first exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for both, the first and second repetition of the initial PUSCH transmission are included in slots relative to the number of the slot k+2 with the allocated resources for the initial PUSCH transmission.

Thus, the allocated resources for the first and second repetition are included in the slots with slot numbers (k+2)+0 and (k+2)+1, respectively. Additionally two values S' and two values L' are comprised indicating that the allocated resources for the first and second repetition of the initial PUSCH transmission start in the respective slot with slot number (k+2)+0 and (k+2)+1 at the symbol with symbol numbers 6 and 1, respectively. The respective resource allocations in time domain are also shown.

A Further Usage of the First Exemplary Implementation

Figures 12, 13:
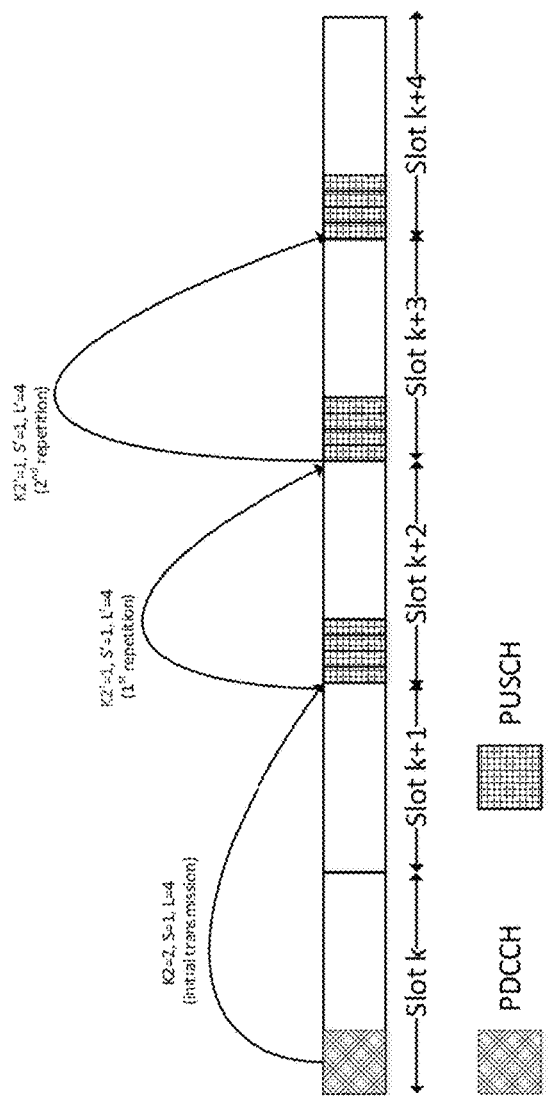
FIGS. 12-13. show a schematic illustration of a RRC configured table for PUSCH repetitions and corresponding resource allocations in time domain according to a further usage of the first exemplary implementation.

Another usage of the RRC configured table of the first exemplary implementation is depicted in FIGS. 12-13 where an exemplary RRC configured table for PUSCH repetitions is given and corresponding resource allocations in time domain are shown according to a usage of a first exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value K2 indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for the first repetition of the initial PUSCH transmission is included in the slots relative to the number of the slot k+2 with the allocated resources for the initial PUSCH transmission, and the second repetition is included in the slot relative to the number of the slot (k+2)+0 with the allocated resources for the first repetition.

Thus, the allocated resources for the first and second repetition are included in the slots with slot numbers (k+2)+0 and ((k+2)+0)+1, respectively. Additionally two values S' and two values L' are comprised indicating that the allocated resources for the first and second repetition of the initial PUSCH transmission start in the respective slot with slot number (k+2)+0 and ((k+2)+0)+1 at the symbol with symbol numbers 6 and 1, respectively. The respective resource allocations in time domain are also shown.

In other words, the second slot offset specifies the allocated resources for a subsequent one of the at least one repetition relative to a number of a slot with the allocated resources for a preceding one of the at least one repetition.

Second Exemplary Implementation

The following second exemplary implementation is conceived with the understanding that the at least one additional value, comprised in the indexed row of the RRC configured table, is at least one of a value G' indicating a number of symbols of a gap before the allocated resources for the at least one repetition, a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values G' and/or L' which are specifying allocated resources for the repetition of the initial PUSCH transmission. In addition, the optional additional value indicating the number of the least one repetition may further complement the RRC configured table in that it permits a more flexible determination which of the specified allocated resource are to be used for repetitions.

An example of such a RRC configured table is reproduced herein below, namely as table 2:

TABLE 2

| DCI Row index | PUSCH mapping type | K2 | S | L | L' | {G} |
|---|---|---|---|---|---|---|
| 1 | Type A | K2_1 | S_1 | L_1 | L_1' | {G_1_1, G_1_2 ... G_1_n1} |

TABLE 2-continued

| DCI Row index | PUSCH mapping type | K2 | S | L | L' | {G} |
|---|---|---|---|---|---|---|
| 2 | Type B | K2_2 | S_2 | L_2 | L_2' | {G_2_1, G_2_2 ... G_2_n2} |
| ... | ... | ... | ... | ... | ... | ... ... |
| 16 | ... | ... | ... | ... | ... | ... ... |

In particular, the RRC configured table not only comprises one set of additional values G' and L' but instead comprises one additional value L' which is applicable to all repetitions, and a set of additional values G' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 2. As the terminology may change in the future, this example shall be more broadly understood with regard to its functions and concepts of signaling the additional parameters comprised in a PUSCH time domain resource allocation list IE.

EXAMPLE 2

ASN.1 Notation of
"PUSCH-TIMEDOMAINRESOURCE-
ALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations)) OF PUSCH-TimeDomainResourceAllocation
PUSCH-TimeDomainResourceAllocation : := SEQUENCE {
    k2                            INTEGER(0..32) OPTIONAL, -
- Need S
    mappingType                   ENUMERATED {typeA, typeB},
    startSymbolAndLength          INTEGER (0..127)
    LengthOfEachRepetition        INTEGER(0..32)
    numberOfRepetitions           INTEGER(0..n)
    RepetitionGap                 SEQUENCE{
        G                         INTEGER(0..32)
    }
}
-- TAG-PUSCH-TIMEDOMAINRESOURCEALLOCATIONLIST-STOP
-- ASN1STOP
```

As can be seen from this example 2, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value L' (termed length of each repetition) indicating the length in number of symbols of each repetition, a value indicating the number of repetitions (termed number of repetitions), and for each of the repetitions (termed repetition gap), a value G' indicating a number of symbols of a gap before the allocated resources for the at least one repetition.

When comparing the PUSCH time domain resource allocation list IE of example 2 with the RRC configure table in table 2, it can be seen that the value indicating the number of repetitions (termed number of repetitions) of the IE is only indirectly reflected in the RRC configured table, namely in form of the total number of the values G'. This value may, however, also be directly included in the RRC configured table.

The additional values shall be explained in further detail with respect to the different usages of the second exemplary implementation as depicted in FIGS. 14-17.

One Usage of the Second Exemplary Implementation

Figures 14, 15:
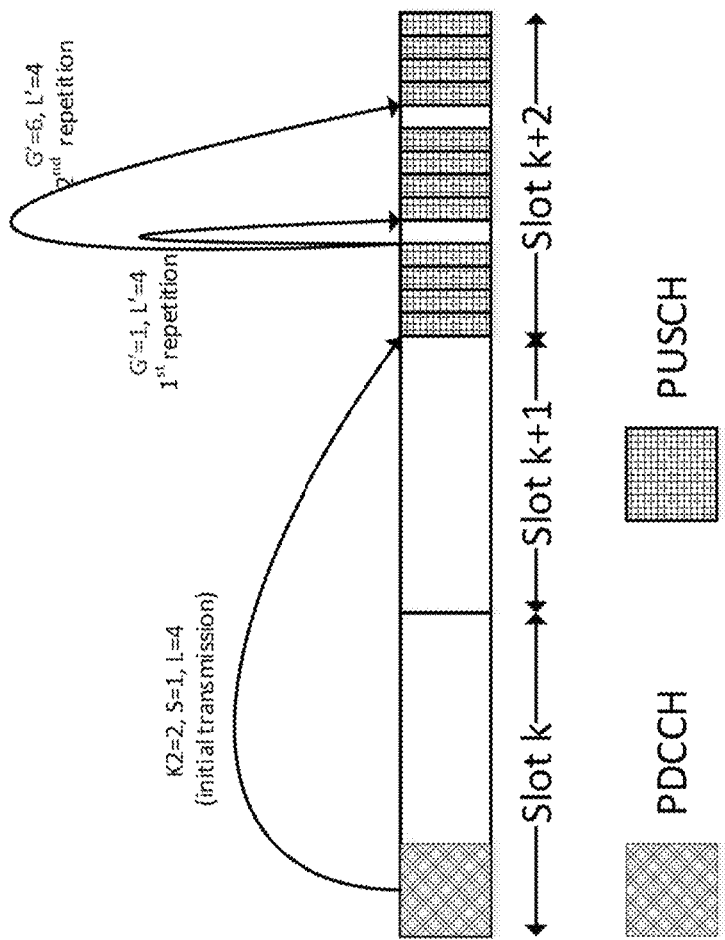
FIGS. 14-15. show a schematic illustration of a RRC configured table for PUSCH repetitions and corresponding resource allocations in time domain according to a usage of a second exemplary implementation.

One usage of the RRC configured table of the second exemplary implementation is depicted in FIGS. 14-15 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value K2 indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises one additional value L' indicating the length in number of symbols is 4 for the allocated resources of each of the first and second repetition, and two additional values G' indicating that the allocated resources for the first and second repetition of the initial PUSCH transmission start at a symbol with a gap G' of a number of symbols 1, 6 before the allocated resources.

For the first and the second repetition, the number of symbols of the gap indicated by value G' is relative to a number 4 of a last symbol within slot k+2 of the allocated resources for the initial PUSCH transmission.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 6 symbols determines the allocated resources for the second repetition to start at symbol 4+6 and to end at symbol number 4+6+4. The respective resource allocations in time domain are also shown.

Another Usage of the Second Exemplary Implementation

Figures 16, 17:
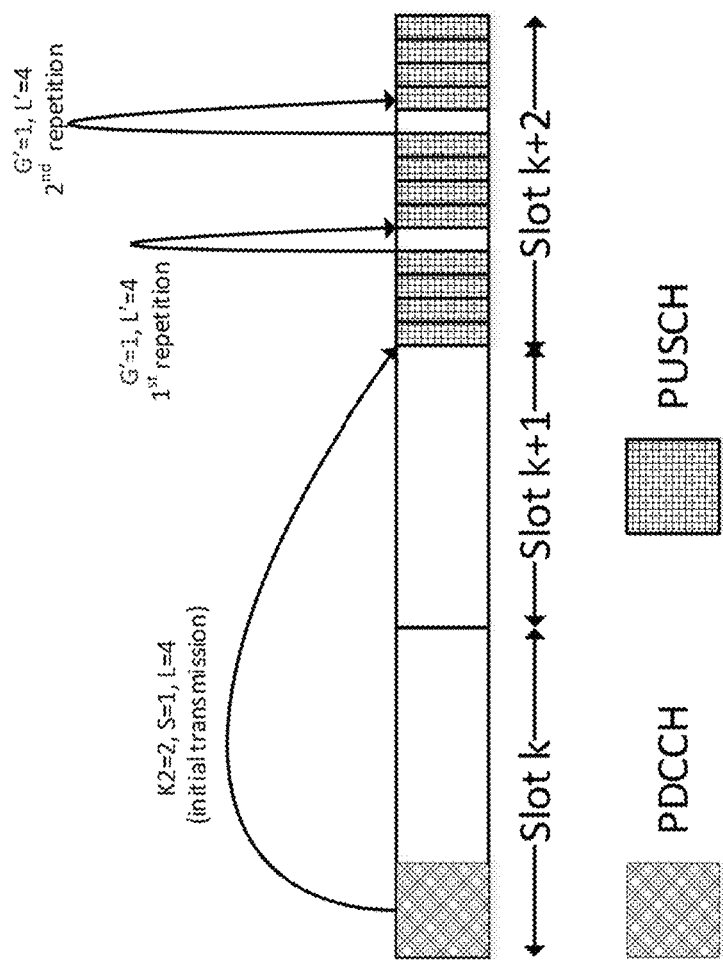
FIGS. 16-17. show a schematic illustration of a RRC configured table for PUSCH repetitions and corresponding resource allocations in time domain according to another usage of the second exemplary implementation.

Another usage of the RRC configured table of the second exemplary implementation is depicted in FIGS. 16-17 where an exemplary RRC configured table for PUSCH repetitions is given and corresponding resource allocations in time domain are shown according to another usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises one additional value L' indicating the length in number of symbols is 4 for the allocated resources of each of the first and second repetition, and two additional values G' indicating that the allocated resources for the first and second repetition of the initial PUSCH transmission start at a symbol with a gap of a number of symbols 1, 6 before the allocated resources.

For the first repetition, the number of symbols of the gap indicated by value G' is relative to a number 4 of a last symbol within slot k+2 of the allocated resources for the initial PUSCH transmission. For the second repetition, the number of the symbols of the gap indicated by value G' is relative to the number 4+1+4 of a last symbol of the slot k+2 of the allocated resource for the first repetition.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 1 symbols determines the allocated resources for the second repetition to start at symbol 4+1+4+1 and to end at symbol number 4+1+4+1+4.

In other words, the number of symbols of the gap specifies the allocated resources for a subsequent one of the at least one repetition relative to a number of a last symbol of the allocated resources for a preceding one of the at least one repetition.

Third Exemplary Implementation

The following second exemplary implementation is conceived with the understanding that the at least one additional value, comprised in the indexed row of the RRC configured table, is at least one of a value G' indicating a number of symbols of a gap before the allocated resources for the at least one repetition, a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values G' and/or L' which are specifying allocated resources for the repetition of the initial PUSCH transmission. In addition, the optional additional value indicating the number of the least one repetition may further complement the RRC configured table in that it permits a more flexible determination as to which of the specified allocated resource are to be used for repetitions.

An example of such a RRC configured table is reproduced herein below, namely as table 3:

TABLE 3

| DCI Row index | PUSCH mapping | K2 type | S | L | {L'}, {G} |
|---|---|---|---|---|---|
| 1 | Type A | K2_1 | S_1 | L_1 | {L'_1_1, L'_1_2 ... L'_1_n1}, {G_1_1, G_1_2 ... G_1_n1} |
| 2 | Type B | K2_2 | S_2 | L_2 | {L'_2_1, L'_2_2 ... L'_2_n2}, {G_2_1, G_2_2 ... G_2_n2} |
| ... | ... | ... | ... | ... ... | |
| 16 | ... | ... | ... | ... ... | |

In particular, the RRC configured table not only comprises one set of additional values G' and L' but instead comprises a set of additional values G' and L' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 3. As the terminology may change in the future, this example shall be more broadly understood with regard to its functions and concepts of signaling the additional parameters comprised in a PUSCH time domain resource allocation list IE.

EXAMPLE 3

ASN.1 Notation of
"PUSCH-TIMEDOMAINRESOURCE-
ALLOCATIONLIST IE"

```
-- ASN1START
-- TAG-PUSCH-TIMEDOMAINRESOURCEALLOCATIONLIST-START
PUSCH-TimeDomainResourceAllocationList : :=      SEQUENCE (SIZE(1..maxNrofUL-
Allocations)) OF PUSCH-TimeDomainResourceAllocation
PUSCH-TimeDomainResourceAllocation : := SEQUENCE {
    k2                              INTEGER(0..32) OPTIONAL, -
- Need S
    mappingType                     ENUMERATED {typeA, typeB},
    startSymbolAndLength            INTEGER (0..127)
    numberOfRepetitions             INTEGER(0..n)
    EachRepetition                  SEQUENCE{
       LengthOfEachRepetition       INTEGER(0..32)
       G                            INTEGER(0..32)
    }
}
-- TAG-PUSCH-TIMEDOMAINRESOURCEALLOCATIONLIST-STOP
-- ASN1STOP
```

As can be seen from this example 3, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of repetitions), and for each of the repetitions (termed repetition gap), a value L' (termed length of each repetition) indicating the length in number of symbols of each repetition, and a value G' indicating a number of symbols of a gap before the allocated resources for the at least one repetition.

When comparing the PUSCH time domain resource allocation list IE of example 3 with the RRC configure table in table 3, it can be seen that the value indicating the number of repetitions (termed number of repetitions) of the IE is only indirectly reflected in the RRC configured table, namely in form of the total number of each of the values G' and L'. This value may, however, also be directly included in the RRC configured table.

The additional values shall be explained in further detail with respect to the different usages of the third exemplary implementation as depicted in FIGS. 18-21.

One Usage of the Third Exemplary Implementation

Figures 18, 19:
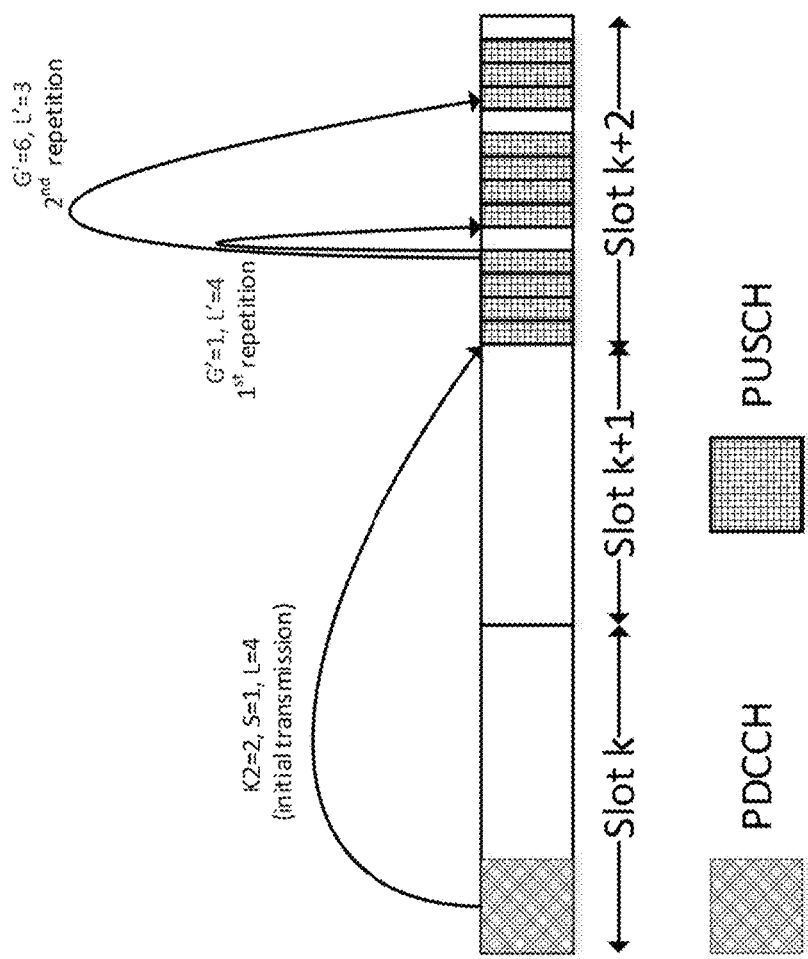
FIGS. 18-19. show a schematic illustration of a RRC configured table for PUSCH repetitions and corresponding resource allocations in time domain according to a usage of a third exemplary implementation.

One usage of the RRC configured table of the third exemplary implementation is depicted in FIGS. 18-19 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 3 for the allocated resources of the first and second repetition, and two additional values G' indicating that the allocated resources, for the first and second repetition of the initial PUSCH transmission, start at a symbol with a gap G' of a number of symbols 1, 6 before the allocated resources.

For the first and the second repetition, the number of symbols of the gap indicated by value G' is relative to a number 4 of a last symbol within slot k+2 of the allocated resources for the initial PUSCH transmission.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 6 symbols determines the allocated resources for the second repetition to start at symbol 4+6 and to end at symbol number 4+6+3. The respective resource allocations in time domain are also shown.

Another Usage of the Second Exemplary Implementation

Another usage of the RRC configured table of the second exemplary implementation is depicted in FIGS. 20-21 where an exemplary RRC configured table for PUSCH repetitions is given and corresponding resource allocations in time domain are shown according to another usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 3 for the allocated resources of the first and second repetition, and two additional values G' indicating that the allocated resources, for the first and second repetition of the initial PUSCH transmission, start at a symbol with a gap G' of a number of symbols 1, 6 before the allocated resources.

For the first repetition, the number of symbols of the gap indicated by value G' is relative to a number 4 of a last symbol within slot k+2 of the allocated resources for the initial PUSCH transmission. For the second repetition, the number of the symbols of the gap indicated by value G' is relative to the number 4+1+4 of a last symbol of the slot k+2 of the allocated resource for the first repetition.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 1 symbols determines the allocated resources for the second repetition to start at symbol 4+1+4+1 and to end at symbol number 4+1+4+1+3.

In other words, the number of symbols of the gap specifies the allocated resources for a subsequent one of the at least one repetition relative to a number of a last symbol of the allocated resources for a preceding one of the at least one repetition.

Fourth Exemplary Implementation

The following fourth exemplary implementation is conceived with the understanding that the at least one additional value, comprised in the indexed row of the RRC configured table, is at least one of a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values L' which are specifying allocated resources for the repetition of the initial PUSCH transmission. In addition, the optional additional value indicating the number of the least one repetition may further complement the RRC configured table in that it permits a more flexible determination as to which of the specified allocated resource are to be used for repetitions.

An example of such a RRC configured table is reproduced herein below, namely as table 4:

TABLE 4

| DCI Row index | PUSCH mapping type | K2 | S | L | {L'} |
|---|---|---|---|---|---|
| 1 | Type A | K2_1 | S_1 | L_1 | {L'_1_1, L'_1_2 ... L'_1_n1} |
| 2 | Type B | K2_2 | S_2 | L_2 | {L'_2_1, L'_2_2 ... L'_2_n2} |
| ... | ... | ... | ... | ... | ... |
| 16 | ... | ... | ... | ... | ... |

In particular, the RRC configured table not only comprises one additional value L' but instead comprises a set of additional values L' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 4. As the terminology may change in the future, this example shall be more broadly understood with regard to its functions and concepts of signaling the additional parameters comprised in a PUSCH time domain resource allocation list IE.

EXAMPLE 4

ASN.1 Notation of "PUSCH-TIMEDOMAINRESOURCE-ALLOCATIONLIST IE"

```
-- ASN1START
-- TAG-PUSCH-TIMEDOMAINRESOURCEALLOCATIONLIST-START
PUSCH-TimeDomainResourceAllocationList : :=     SEQUENCE (SIZE(1..maxNrofUL-
Allocations)) OF PUSCH-TimeDomainResourceAllocation
PUSCH-TimeDomainResourceAllocation : := SEQUENCE {
    k2                               INTEGER(0..32) OPTIONAL, -
- Need S
    mappingType                      ENUMERATED {typeA, typeB},
    startSymbolAndLength             INTEGER (0..127)
    numberOfRepetitions              INTEGER(0..n)
    Repetitionlength                 SEQUENCE{
       LengthOfEachRepetition            INTEGER(0..32)
    }
}
-- TAG-PUSCH-TIMEDOMAINRESOURCEALLOCATIONLIST-STOP
-- ASN1STOP
```

As can be seen from this example 4, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of repetitions), and for each of the repetitions (termed repetition length), a value L' (termed length of each repetition) indicating the length in number of symbols of each repetition for the at least one repetition.

When comparing the PUSCH time domain resource allocation list IE of example 4 with the RRC configure table in table 4, it can be seen that the value indicating the number of repetitions (termed number of repetitions) of the IE is only indirectly reflected in the RRC configured table, namely in form of the total number of the values L'. This value may, however, also be directly included in the RRC configured table.

Figures 22, 23:
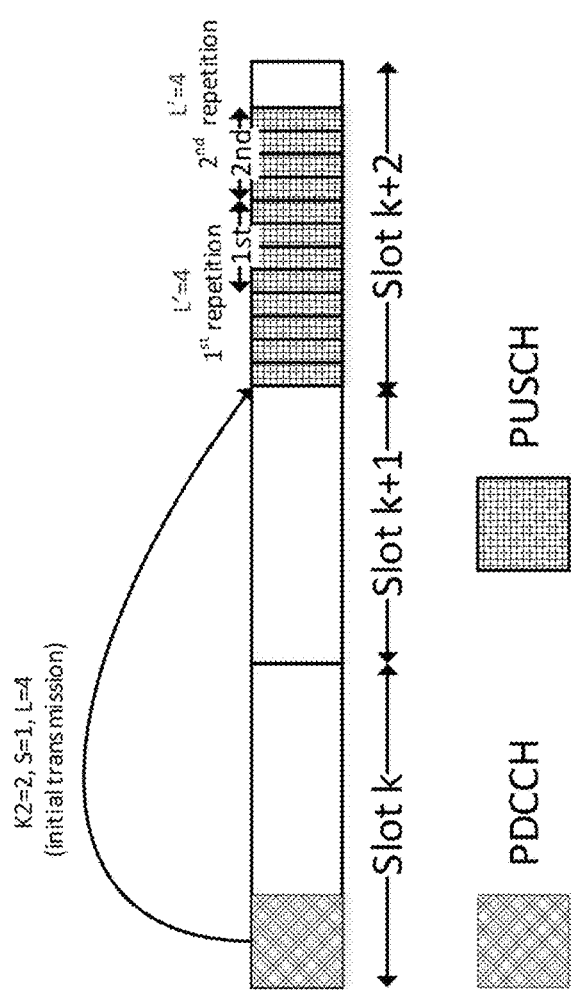
FIGS. 22-23. show a schematic illustration of a RRC configured table for PUSCH repetitions and corresponding resource allocations in time domain according to a usage of a fourth exemplary implementation.

The additional values shall be explained in further detail with respect to the different usage of the fourth exemplary implementation as depicted in FIGS. 22-23.

One Usage of the Fourth Exemplary Implementation

One usage of the RRC configured table of the fourth exemplary implementation is depicted in FIGS. 22-23 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 4 for the allocated resources of the first and second repetition.

For the first and the second repetition, the start of the allocated resources is contiguously following the last symbol of the allocated resources for the respective one of the initial PUSCH transmission and of the first repetition thereof.

Thus, the allocated resources for the first and second repetition are included in the slots with slot numbers k+2. In particular, the number of the last symbol of the allocated resources of the initial PUSCH transmission is 4. Thereby, the allocated resources for the first repetition is determined to start at symbol number 4 and to end at symbol number 4+4. And the allocated resources for the second repetition is determined to start at symbol 4+4 and to end at symbol number 4+4+4. The respective resource allocations in time domain are also shown.

Further Exemplary Implementation

Referring now to a further exemplary implementation, according to which the behavior of the either first or the second exemplary implementation can be configured at the base station 460. For this purpose, an exemplary PUSCH time domain resource allocation list IE can be specified is reproduced herein below, namely as in example 5. As the terminology may change in the future, this example shall be more broadly understood with regard to its functions and concepts of signaling the additional parameters comprised in a PUSCH time domain resource allocation list IE.

EXAMPLE 5

ASN.1 Notation of "PUSCH-TIMEDOMAINRESOURCE-ALLOCATIONLIST IE"

```
-- ASN1START
-- TAG-PUSCH-TIMEDOMAINRESOURCEALLOCATIONLIST-START
PUSCH-TimeDomainResourceAllocationList : :=         SEQUENCE (SIZE(1..maxNrofUL-
Allocations)) OF PUSCH-TimeDomainResourceAllocation
PUSCH-TimeDomainResourceAllocation : := SEQUENCE {
    k2                                  INTEGER(0..32) OPTIONAL, -
- Need S
    mappingType                         ENUMERATED {typeA, typeB},
    startSymbolAndLength                INTEGER (0..127)
    choice of                           {
        numberOfRIVassignments              INTEGER(0..n)
        RIVassignment                       SEQUENCE{
        k2'                                 INTEGER(0..32)
        startSymbolAndLength'               INTEGER(0..127)
        }
    }
    or
                                        {
        numberOfRepetitions                 INTEGER(0..n)
        EachRepetition                      SEQUENCE{
        LengthOfEachRepetition              INTEGER(0..32)
        G                                   INTEGER(0..32)
        }
    }
}
-- TAG-PUSCH-TIMEDOMAINRESOURCEALLOCATIONLIST-STOP
-- ASN1STOP
```

In an even further exemplary implementation, the PUSCH time domain resource allocation list IE additionally comprises a parameter indicating whether the transport block size is calculated for each PUSCH transmission separately, or whether a combined transport block size is calculated for all PUSCH transmissions, including the initial PUSCH transmission and the at least one repetition thereof.

This further exemplary implementation may be combined with any one of the first to fourth exemplary implementations. If combined with the first exemplary implementation, an exemplary PUSCH time domain resource allocation list IE can be specified as reproduced herein below, namely as in example 6. As the terminology may change in the future, this example shall be more broadly understood with regard to its functions and concepts of signaling the additional parameters comprised in a PUSCH time domain resource allocation list IE.

EXAMPLE 6

ASN.1 Notation of
"PUSCH-TIMEDOMAINRESOURCE-
ALLOCATIONLIST IE"

```
-- ASN1START
-- TAG-PUSCH-TIMEDOMAINRESOURCEALLOCATIONLIST-START
PUSCH-TimeDomainResourceAllocationList : :=          SEQUENCE (SIZE(1..maxNrofUL-
Allocations)) OF PUSCH-TimeDomainResourceAllocation
PUSCH-TimeDomainResourceAllocation : := SEQUENCE {
  k2                                    INTEGER(0..32) OPTIONAL, -
- Need S
  mappingType                           ENUMERATED {typeA, typeB},
  startSymbolAndLength                  INTEGER (0..127)
  numberOfRIVassignments                INTEGER(0..n)
  RIVassignment                         SEQUENCE{
    k2'                                 INTEGER(0..32)
    startSymbolAndLength'                 INTEGER(0..127)
  }
  TBSMethod                             ENUMERATED {single, combined}
}
-- TAG-PUSCH-TIMEDOMAINRESOURCEALLOCATIONLIST-STOP
-- ASN1STOP
```

Importantly, the example 6 refers to two different calculation mechanism for calculating the transport block size (TBS), namely a combined and a separate TBS calculation. This shall, however not be construed as limitation to the present disclosure. Rather, should an agreement be reached that three or even more different calculation mechanisms are to be used, then a skilled person will readily understand that also the applicable one of the tree or even more different calculation mechanisms can be indicated via the PUSCH time domain resource allocation list IE.

In a further exemplary implementation, the PUSCH time domain resource allocation list IE additionally comprises a parameter indicating whether frequency hopping is applied for each PUSCH transmission separately, or whether continuous frequency hopping is applied for all PUSCH transmissions, including the initial PUSCH transmission and the at least one repetition thereof.

This further exemplary implementation may be combined with any one of the first to forth exemplary implementations.

If combined with the first exemplary implementation, an exemplary PUSCH time domain resource allocation list IE can be specified as reproduced herein below, namely as in example 7. As the terminology may change in the future, this example shall be more broadly understood with regard to its functions and concepts of signaling the additional parameters comprised in a PUSCH time domain resource allocation list IE.

EXAMPLE 7

ASN.1 Notation of
"PUSCH-TIMEDOMAINRESOURCE-
ALLOCATIONLIST IE"

```
-- ASN1START
-- TAG-PUSCH-TIMEDOMAINRESOURCEALLOCATIONLIST-START
PUSCH-TimeDomainResourceAllocationList : :=          SEQUENCE (SIZE(1..maxNrofUL-
Allocations)) OF PUSCH-TimeDomainResourceAllocation
PUSCH-TimeDomainResourceAllocation : := SEQUENCE {
  k2                                    INTEGER(0..32) OPTIONAL, -
- Need S
  mappingType                           ENUMERATED {typeA, typeB},
  startSymbolAndLength                  INTEGER (0..127)
  numberOfRIVassignments                INTEGER(0..n)
  RIVassignment                         SEQUENCE{
    k2'                                 INTEGER(0..32)
    startSymbolAndLength'                 INTEGER(0..127)
  }
  FrequencyHoppingMethod                ENUMERATED {full, half}
}
-- TAG-PUSCH-TIMEDOMAINRESOURCEALLOCATIONLIST-STOP
-- ASN1STOP
```

Importantly, the example 7 refers to two different frequency hopping mechanism, namely a mechanism where frequency hopping is applied either separately or to all of the PUSCH transmissions. This shall, however not be construed as limitation to the present disclosure. Rather, should an agreement be reached that three or even more different frequency hopping mechanisms are to be used, then a skilled person will readily understand that also the applicable one of the tree or even more different frequency hopping mechanism can be indicated via the PUSCH time domain resource allocation list IE.

In an even further exemplary implementation, the PUSCH time domain resource allocation list IE additionally comprises a parameter indicating whether or not demodulation reference symbols, DMRS, are present in all or each individual one of the at least one repetition of the initial PUSCH transmission.

This further exemplary implementation may be combined with any one of the first to forth exemplary implementations. If combined with the first exemplary implementation, an exemplary PUSCH time domain resource allocation list IE can be specified as reproduced herein below, namely as in example 8. As the terminology may change in the future, this example shall be more broadly understood with regard to its functions and concepts of signaling the additional parameters comprised in a PUSCH time domain resource allocation list IE.

EXAMPLE 8

ASN.1 Notation of
"PUSCH-TIMEDOMAINRESOURCE-
ALLOCATIONLIST IE"

a row index m+1 to the RRC configured table, the processor, in operation, determines allocated resources for an initial PUSCH transmission and allocated resources for at least one repetition thereof based on: a number of a slot carrying the received DCI, and the value $K_2$ indicating the slot offsets, and the value SLIV indicating the start and length indicator comprised in indexed row of the RRC configured table; and a transmitter, which in operation, transmits a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a second aspect, a user equipment, UE, is provided comprising: a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the receiver, in operation, receives a configured grant config IE in form of RRC signaling carrying a time domain allocation filed with value m, wherein the value m provides a row index m+1 to the RRC configured table, the processor, in operation, determines allocated resources for an initial PUSCH transmission and allocated resources

```
-- ASN1START
-- TAG-PUSCH-TIMEDOMAINRESOURCEALLOCATIONLIST-START
PUSCH-TimeDomainResourceAllocationList : :=        SEQUENCE (SIZE(1..maxNrofUL-
Allocations)) OF PUSCH-TimeDomainResourceAllocation
PUSCH-TimeDomainResourceAllocation : := SEQUENCE {
    k2                              INTEGER(0..32) OPTIONAL, -
- Need S
    mappingType                     ENUMERATED {typeA, typeB},
    startSymbolAndLength            INTEGER (0..127)
    numberOfRIVassignments          INTEGER(0..n)
    RIVassignment                   SEQUENCE{
      k2'                           INTEGER(0..32)
      startSymbolAndLength'         INTEGER(0..127)
      DMRSPresent                   ENUMERATED {yes, no}
    }
}
-- TAG-PUSCH-TIMEDOMAINRESOURCEALLOCATIONLIST-STOP
-- ASN1STOP
```

According to a first aspect, a user equipment, UE, is provided comprising: a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the receiver, in operation, receives downlink control information, DCI, in form of medium access control, MAC, signaling carrying a time-domain resource assignment filed with value m, wherein the value m provides for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and a transmitter, which in operation, transmits a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a third aspect, which is provided in addition to a first or second aspect, the at least one additional value is one of: a value K2' indicating a second slot offset for the at least one repetition, a value SLIV' indicating a second start and length indicator value for the at least one repetition, and a value indicating the number of the at least one repetition, and/or wherein the second start and length indicator value SLIV' comprises: a value S' indicating a symbol number specifying the start of the allocated resources for the at least one repetition, and a value L' indicating a number of symbols specifying the length of the allocated resources for the at least one repetition.

According to a fourth aspect, which is provided in addition to a third or fourth aspect, in case the at least one additional value is the value $K_2'$ indicating the second slot offset, the second slot offset specifies the allocated resources for all of the at least one repetition relative to: the number of the slot carrying the received DCI, or the value of time domain offset field additionally carried in the received configured grant config IE.

According to a fifth aspect, which is provided in addition to a third or fourth aspect, in case the at least one additional value is the value $K_2'$ indicating the second slot offset, the second slot offset specifies the allocated resources for all of the at least one repetition relative to a number of a slot with the allocated resources for the initial PUSCH transmission.

According to a sixth aspect, which is provided in addition to a third or fourth aspect, in case the at least one additional value is the value $K_2'$ indicating the second slot offset, the second slot offset specifies the allocated resources for a first of the at least one repetition relative to a number of a slot with the allocated resources for the initial PUSCH transmission, or the second slot offset specifies the allocated resources for a subsequent one of the at least one repetition relative to a number of a slot with the allocated resources for a preceding one of the at least one repetition.

According to a seventh aspect, which is provided in addition to a first or second aspect, the at least one value is one of: a value G' indicating a number of symbols of a gap before the allocated resources for the at least one repetition, a value L' indicating a number of symbols specifying the length of the allocated resources for the at least one repetition, and a value indicating the number of the at least one repetition.

According to an eighth aspect, which is provided in addition to a seventh aspect, in case the at least one additional value is the value G' indicating the number of symbols of the gap, the number of symbols of the gap specifies the allocated resources for all of the at least one repetition relative to a number of a last symbol of the allocated resources for the initial PUSCH transmission.

According to a ninth aspect, which is provided in addition to an eighth aspect, in case the at least one additional value is the value G' indicating the number of symbols of the gap, the number of symbols of the gap specifies the allocated resources for a first of the at least one repetition relative to a number of a last symbol of the allocated resources for the initial PUSCH transmission, or the number of symbols of the gap specifies the allocated resources for a subsequent one of the at least one repetition relative to a number of a last symbol of the allocated resources for a preceding one of the at least one repetition.

According to a tenth aspect, which is provided in addition to a third or eighth aspect, in case the at least one additional value is the value L' indicating the number of symbols specifying the length of the allocated resources, the number of symbols specifies the length of the allocated resources for all of the at least one repetition, or the number of symbols specifies the length of the allocated resources for an individual one of the at least one repetition.

According to an eleventh aspect, which is provided in addition to one of the first to tenth aspects, the PUSCH time domain resource allocation list IE additionally comprises at least one of: a parameter indicating whether the transport block size is calculated for each PUSCH transmission separately, or whether a combined transport block size is calculated for all PSUCH transmissions, including the initial PUSCH transmission and the at least one repetition thereof, a parameter indicating whether frequency hopping is applied for each PUSCH transmission separately, or whether continuous frequency hopping is applied for all PUSCH transmissions, including the initial PUSCH transmission and the at least one repetition thereof, and a parameter indicating whether or not demodulation reference symbols, DMRS, are present in all or each individual one of the at least one repetition of the initial PUSCH transmission.

According to a twelfth aspect, a method for a UE, is provided comprising: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; receiving downlink control information, DCI, in form of medium access control, MAC, signaling carrying a time-domain resource assignment filed with value m, wherein the value m provides a row index m+1 to the RRC configured table, determining allocated resources for an initial PUSCH transmission and allocated resources for at least one repetition thereof based on: a number of a slot carrying the received DCI, and the value $K_2$ indicating the slot offsets, and the value SLIV indicating the start and length indicator comprised in indexed row of the RRC configured table; and transmitting a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a thirteenth aspect, a method for a UE, is provided comprising: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; receiving configured grant config IE in form of RRC signaling carrying a time domain allocation filed with value m, wherein the value m provides a row index m+1 to the RRC configured table, determining allocated resources for an initial PUSCH transmission and allocated resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and transmitting a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a fourteenth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the transmitter, in operation, transmits downlink control information, DCI, in form of medium access control, MAC, signaling carrying a time-domain resource assignment filed with value m, wherein the value m provides a row index m+1 to the RRC configured table, the processor, in operation, allocates resources for an initial PUSCH transmission and allocates resources for at least one repetition thereof based on: a number of a slot carrying the transmitted DCI, and the value $K_2$ indicating the slot offsets, and the value SLIV indicating the start and length indicator comprised in indexed row of the RRC configured table; and a receiver, which in operation, receives a PUSCH transmission using the respectively allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a fifteenth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the transmitter, in operation, transmits a configured grant config IE in form of RRC signaling carrying a time domain allocation filed with value m, wherein the value m provides a row index m+1 to the RRC configured table, the processor, in operation, allocates resources for an initial PUSCH transmission and allocates resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and a receiver, in operation, receives a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a sixteenth aspect, a method for a base station, BS, is provided comprising: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; transmitting downlink control information, DCI, in form of medium access control, MAC, signaling carrying a time-domain resource assignment filed with value m, wherein the value m provides a row index m+1 to the RRC configured table, allocating resources for an initial PUSCH transmission and allocating resources for at least one repetition thereof based on: a number of a slot carrying the transmitted DCI, and the value $K_2$ indicating the slot offsets, and the value SLIV indicating the start and length indicator comprised in indexed row of the RRC configured table; receiving a PUSCH transmission using the respectively allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a seventeenth aspect, a method for a base station, BS, is provided comprising: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; transmitting a configured grant config IE in form of RRC signaling carrying a time domain allocation filed with value m, wherein the value m provides a row index m+1 to the RRC configured table, allocating resources for an initial PUSCH transmission and allocating resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; receiving a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor.

In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IOT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The invention claimed is:

1. An integrated circuit for controlling a user equipment (UE), the integrated circuit comprising:
receiving circuitry, which in operation, receives a physical uplink shared channel (PUSCH) config information element (IE) in form of radio resource control (RRC) signaling, the PUSCH config IE being applicable to a particular bandwidth part;

processing circuitry, which in operation, configures a RRC configured table which is defined by a PUSCH time domain resource allocation list IE carried in the received PUSCH config IE, the RRC configured table comprising rows, each with a value indicating a PUSCH mapping type, a slot offset value (K2) indicating a slot offset, and a start and length indicator value (SLIV) indicating a start and length indicator, and a value indicating a number of PUSCH repetitions, wherein the number of PUSCH repetitions is one of a defined plurality of numbers of PUSCH repetitions; wherein the receiving circuitry, in operation, receives downlink control information (DCI) signaling carrying a time-domain resource assignment field with value m, wherein the value m provides a row index m+1 to the RRC configured table, and the processing circuitry, in operation, determines allocated resources for an initial PUSCH transmission and allocated resources for at least one of the number of PUSCH repetitions based on:
a number of a slot carrying the received DCI, and
the value K2 indicating the slot offset, the value SLIV indicating the start and length indicator, and the value indicating the number of PUSCH repetitions included in the indexed row of the RRC configured table; and transmitting circuitry, which in operation, transmits a PUSCH transmission using the respectively determined allocated resources for the initial PUSCH transmission and for the at least one of the number of PUSCH repetitions.

2. The integrated circuit according to claim 1, wherein the determination of allocated resources is based on at least one additional value included in the indexed row of the RRC configured table which is specifying the allocated resources in time domain for the at least one repetition of the initial PUSCH transmission, and the at least one additional value is one of:
a second slot offset value (K2') indicating a second slot offset for the at least one repetition, or
a second start and length indicator value (SLIV') indicating a second start and length indicator value for the at least one repetition,
wherein the second start and length indicator value SLIV' comprises:
a start value (S') indicating a symbol number specifying the start of the allocated resources for the at least one repetition, and
a length value (L') indicating a number of symbols specifying the length of the allocated resources for the at least one repetition.

3. The integrated circuit according to claim 2, wherein, in case the at least one additional value is the value K2' indicating the second slot offset,
the second slot offset specifies the allocated resources for all of the at least one repetition relative to:
the number of the slot carrying the received DCI, or
the value of time domain offset field additionally carried in the received configured grant config IE.

4. The integrated circuit according to claim 2, wherein, in case the at least one additional value is the value K2' indicating the second slot offset,
the second slot offset specifies the allocated resources for all of the at least one repetition relative to a number of a slot with the allocated resources for the initial PUSCH transmission.

5. The integrated circuit according to claim 2, wherein, in case the at least one additional value is the value K2' indicating the second slot offset,
the second slot offset specifies the allocated resources for a first of the at least one repetition relative to a number of a slot with the allocated resources for the initial PUSCH transmission, or
the second slot offset specifies the allocated resources for a subsequent one of the at least one repetition relative to a number of a slot with the allocated resources for a preceding one of the at least one repetition.

6. The integrated circuit according to claim 2, wherein the at least one additional value is one of:
a gap value (G') indicating a number of symbols of a gap before the allocated resources for the at least one repetition, or
the length value (L') indicating a number of symbols specifying the length of the allocated resources for the at least one repetition.

7. The integrated circuit according to claim 6, wherein, in case the at least one additional value is the value G' indicating the number of symbols of the gap,
the number of symbols of the gap specifies the allocated resources for all of the at least one repetition relative to a number of a last symbol of the allocated resources for the initial PUSCH transmission.

8. The integrated circuit according to claim 6, wherein, in case the at least one additional value is the value G' indicating the number of symbols of the gap,
the number of symbols of the gap specifies the allocated resources for a first of the at least one repetition relative to a number of a last symbol of the allocated resources for the initial PUSCH transmission, or
the number of symbols of the gap specifies the allocated resources for a subsequent one of the at least one repetition relative to a number of a last symbol of the allocated resources for a preceding one of the at least one repetition.

9. The integrated circuit according to claim 2, wherein, in case the at least one additional value is the value L' indicating the number of symbols specifying the length of the allocated resources,
the number of symbols specifies the length of the allocated resources for all of the at least one repetition, or
the number of symbols specifies the length of the allocated resources for an individual one of the at least one repetition.

10. The integrated circuit according to claim 1, wherein the PUSCH time domain resource allocation list IE additionally comprises at least one of:
a parameter indicating whether a transport block size is calculated for each PUSCH transmission separately, or whether a combined transport block size is calculated for all PUSCH transmissions, including the initial PUSCH transmission and the at least one repetition thereof,
a parameter indicating whether frequency hopping is applied for each PUSCH transmission separately, or whether continuous frequency hopping is applied for all PUSCH transmissions, including the initial PUSCH transmission and the at least one repetition thereof, and
a parameter indicating whether or not demodulation reference symbols (DMRS) are present in all or each individual one of the at least one repetition of the initial PUSCH transmission.

* * * * *